United States Patent
Kawamata et al.

(10) Patent No.: US 10,315,556 B2
(45) Date of Patent: Jun. 11, 2019

(54) INFORMATION PROVIDING APPARATUS

(71) Applicants: DENSO CORPORATION, Kariya, Aichi-pref. (JP); SUBARU CORPORATION, Shibuya-ku, Tokyo (JP)

(72) Inventors: Takaya Kawamata, Kariya (JP); Akifumi Shii, Kariya (JP); Kensuke Suzuki, Kariya (JP); Toshiya Furukawa, Tokyo (JP); Tsukasa Mikuni, Tokyo (JP); Isamu Nagasawa, Tokyo (JP)

(73) Assignees: DENSO CORPORATION, Kariya, Aichi-pref. (JP); SUBARU CORPORATION, Shibuya-ku, Tokyo (JP)

( * ) Notice: Subject to any disclaimer, the term of this patent is extended or adjusted under 35 U.S.C. 154(b) by 101 days.

(21) Appl. No.: 15/522,197

(22) PCT Filed: Oct. 27, 2015

(86) PCT No.: PCT/JP2015/005392
§ 371 (c)(1),
(2) Date: Apr. 26, 2017

(87) PCT Pub. No.: WO2016/067596
PCT Pub. Date: May 6, 2016

(65) Prior Publication Data
US 2017/0320430 A1    Nov. 9, 2017

(30) Foreign Application Priority Data
Oct. 29, 2014    (JP) .................................. 2014-220327

(51) Int. Cl.
*B60Q 3/00* (2017.01)
*B60Q 1/24* (2006.01)
(Continued)

(52) U.S. Cl.
CPC ................ *B60Q 1/24* (2013.01); *B60K 35/00* (2013.01); *B60Q 1/2607* (2013.01); *B60Q 3/78* (2017.02);
(Continued)

(58) Field of Classification Search
CPC .......... B60Q 1/24; B60Q 1/2607; B60Q 3/70; B60Q 3/82
See application file for complete search history.

(56) References Cited

U.S. PATENT DOCUMENTS 9,212,809 B2 * 12/2015 Salter ...................... F21V 25/10
2004/0090317 A1 * 5/2004 Rothkop ................ B60Q 9/008
340/435

(Continued)

FOREIGN PATENT DOCUMENTS

JP    2007329101 A    12/2007
JP    2009126193 A    6/2009

*Primary Examiner* — Andrew J Coughlin
(74) *Attorney, Agent, or Firm* — Harness, Dickey & Pierce, P.L.C.

(57) ABSTRACT

An information providing apparatus in a vehicle coordinates with a first light emitter including light-emitting elements arranged in a linear form including at least one line on a compartment side of a door of the vehicle, and a second light emitter projecting light onto a projection target member in a forward visual field of a driver of the vehicle. The information providing apparatus repeatedly acquires status information including surroundings status indicating status of surroundings of the vehicle, and executes control to the first light emitter and second light emitter based on the status information. The control makes the first light emitter and second light emitter provide light emission in a light emission mode associated with acquired surroundings status indicated by the status information.

11 Claims, 14 Drawing Sheets

(51) Int. Cl.
*B60K 35/00* (2006.01)
*B60R 11/02* (2006.01)
*B60R 21/00* (2006.01)
*G02B 27/01* (2006.01)
*G09G 5/00* (2006.01)
*B60Q 1/26* (2006.01)
*B60R 13/02* (2006.01)
*G09G 3/00* (2006.01)
*B60Q 3/78* (2017.01)

(52) U.S. Cl.
CPC ............. *B60R 11/02* (2013.01); *B60R 13/02* (2013.01); *B60R 21/00* (2013.01); *G02B 27/01* (2013.01); *G09G 3/001* (2013.01); *G09G 5/00* (2013.01); *B60K 2350/2008* (2013.01); *B60R 2013/0287* (2013.01); *G02B 2027/0138* (2013.01)

(56) References Cited

U.S. PATENT DOCUMENTS

2010/0302020 A1* 12/2010 Lenneman ............. B60K 35/00
340/441
2015/0138797 A1* 5/2015 Salter ........................ B60Q 9/00
362/510

* cited by examiner

FIG. 11
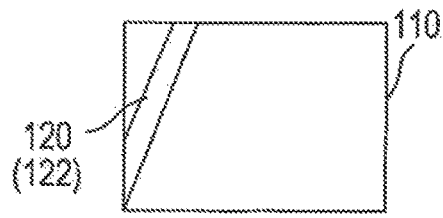
(A)
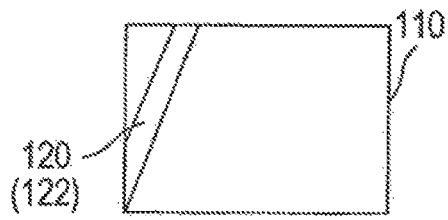
(C)
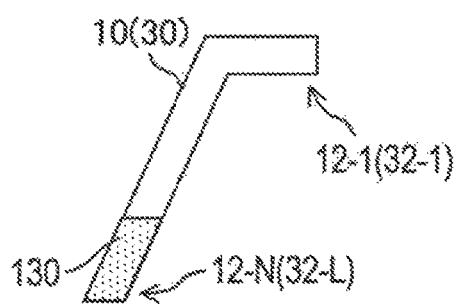
(B)
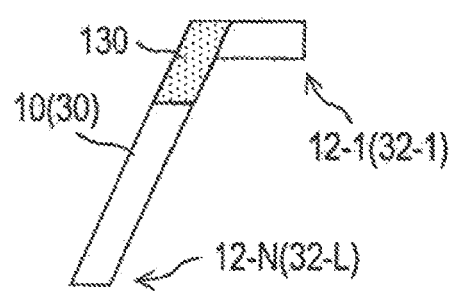
(D)
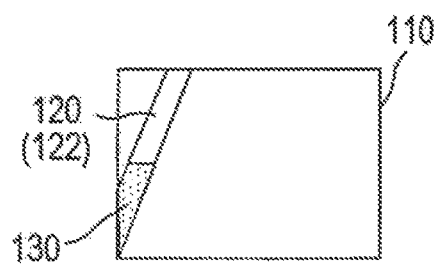
(E)
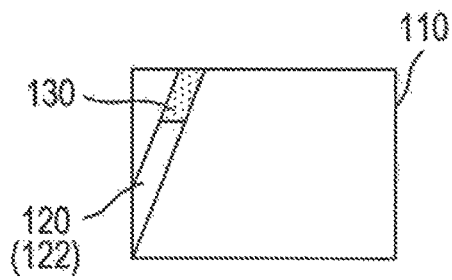
(G)
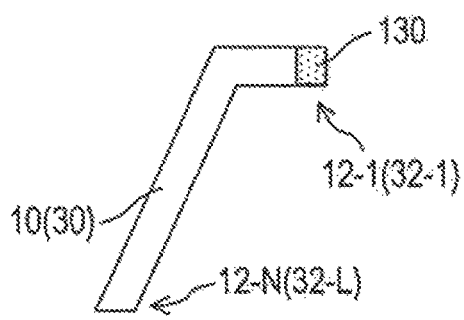
(F)
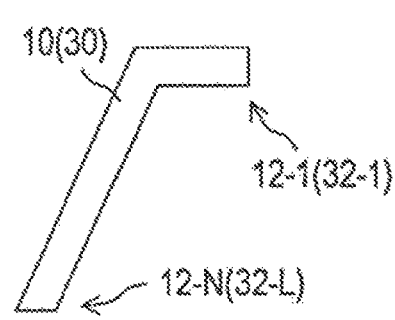
(H)

FIG. 13
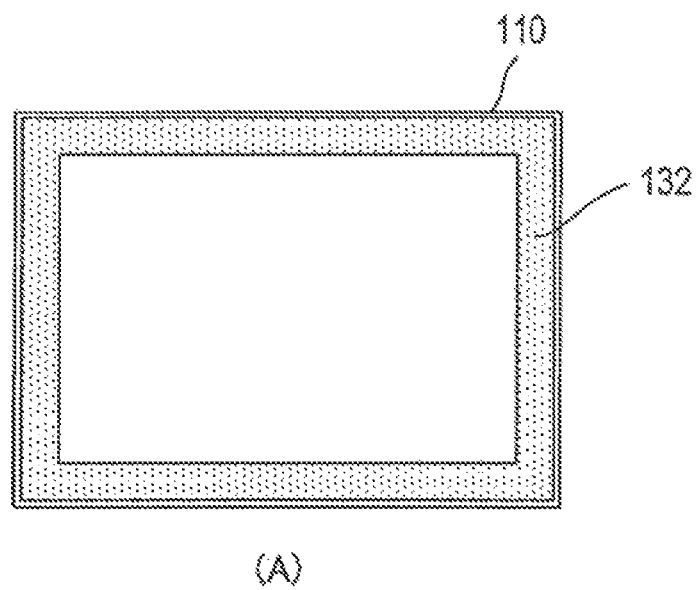
(A)
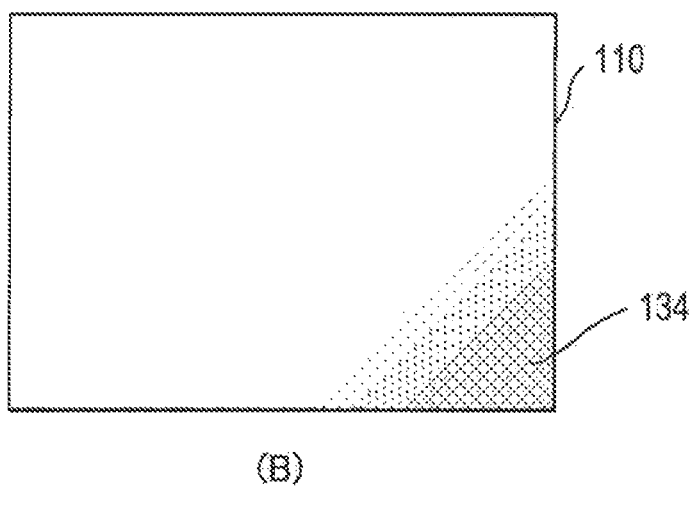
(B)

INFORMATION PROVIDING APPARATUS

CROSS REFERENCE TO RELATED APPLICATIONS

This application is a U.S. National Phase Application under 35 U.S.C. 371 of International Application No. PCT/JP2015/005392 filed on Oct. 27, 2015 and published in Japanese as WO 2016/067596 A1 on May 6, 2016. This application is based on and claims the benefit of priority from Japanese Patent Application No. 2014-220327 filed on Oct. 29, 2014. The entire disclosures of all of the above applications are incorporated herein by reference.

TECHNICAL FIELD

The present disclosure relates to an information providing apparatus mounted in a vehicle.

BACKGROUND ART

There is conventionally known a vehicle-mounted lighting apparatus that includes a light source, a bar-shaped light guide having a light-scattering region, and a light source control circuit (refer to Patent Literature 1). The bar-shaped light guide, which is a cylindrical member internally arranging the light source, is provided with rectangular holes for passing light arranged intermittently, as light-scattering regions.

PRIOR ART LITERATURES

Patent Literature

Patent Literature 1: JP 2009-126193 A

SUMMARY OF INVENTION

It is demanded that an information providing apparatus mounted in a vehicle compartment provide the surroundings status of a vehicle to an occupant of the vehicle in order to improve traveling safety in the vehicle.

The lighting apparatus in Patent Literature 1 may be configured to control the light source for presenting the surroundings status of a vehicle. A well-known lighting apparatus designed to present the surroundings status of a vehicle will be referred to as an informing lighting apparatus.

Meanwhile, a head-up display may be used as an apparatus that provides information to an occupant of a vehicle. A conventional head-up display presents information about the surroundings status of the vehicle and the behavior of the vehicle independently of another apparatus providing information.

If the conventional head-up display and the informing lighting apparatus are both mounted in the vehicle, the conventional head-up display and the informing lighting apparatus each provide information about the surroundings status of the vehicle.

Consequently, if the conventional head-up display and the informing lighting apparatus provide the same information at different points of time, the occupant of the vehicle may become confused about which apparatus is reliable as the source of information. If the conventional head-up display and the informing lighting apparatus simultaneously provide the same information, the occupant of the vehicle may become confused about which apparatus should be selected as the source of information.

It is an object of the present disclosure to provide increased user-friendliness when a plurality of information providing apparatuses are mounted in a vehicle.

To achieve the above object, according to an example of the present disclosure, an information providing apparatus mounted in a vehicle is provided with an information acquisition section and a light emission control section. The information acquisition section repeatedly acquires status information including a surroundings status indicating a status of surroundings of the vehicle. The light emission control section executes control to a first light emitter and a second light emitter based on the status information acquired by the information acquisition section, the control making the first light emitter and the second light emitter provide light emission in a light emission mode associated with an acquired surroundings status that is the surroundings status indicated by the status information acquired by the information acquisition section.

The first light emitter is a light emitter including a plurality of light-emitting elements that are arranged in a linear form including at least one line on a compartment side of a door of the vehicle. The second light emitter, which is different from the first light emitter, emits light that is projected onto a projection target member arranged in a forward visual field of a driver of the vehicle.

The information providing apparatus uses the first light emitter and the second light emitter as a single light-emitting mechanism and emits light in a mode that varies with the surroundings status. That is, the information providing apparatus according to the present disclosure can control the first and second light emitters in a coordinated manner. By the information providing apparatus controlling the first and second light emitters, the surroundings status of the vehicle can be presented.

The information providing apparatus according to the above example can thus provide increased user-friendliness when a plurality of information providing apparatuses are mounted in a vehicle. Further, the information providing apparatus controls the light emission of two systems formed of the first and second light emitters, increasing the amount of information provided to an occupant of the vehicle.

When the acquired surroundings status meets a predefined condition, a light emission control section according to the above example controls the first and second light emitters so as to emit light in a transitional light emission mode. The transitional light emission mode is a mode that makes a target, from which light is emitted, transition from the first light emitter to the second light emitter.

According to the above-described information providing apparatus, when the acquired surroundings status meets the predefined condition, the first and second light emitters are controlled in the transitional light emission mode. The line-of-sight of the occupant can be directed to a projection target member at an appropriate point of time by sequentially changing the target, from which light is emitted, from the first light emitter to the second light emitter.

BRIEF DESCRIPTION OF DRAWINGS

The above and other objects, features and advantages of the present disclosure will become more apparent from the following detailed description made with reference to the accompanying drawings. In the drawings:

FIG. 11 is a diagram for explaining concrete examples of the third light emission mode;

FIG. 13 illustrates modified examples of a predefined light-emitting region of a display apparatus illuminating in the third light emission mode.

EMBODIMENTS FOR CARRYING OUT INVENTION

An embodiment of the present disclosure will now be described with reference to the accompanying drawings.

<Information Providing System>

Figure 1:
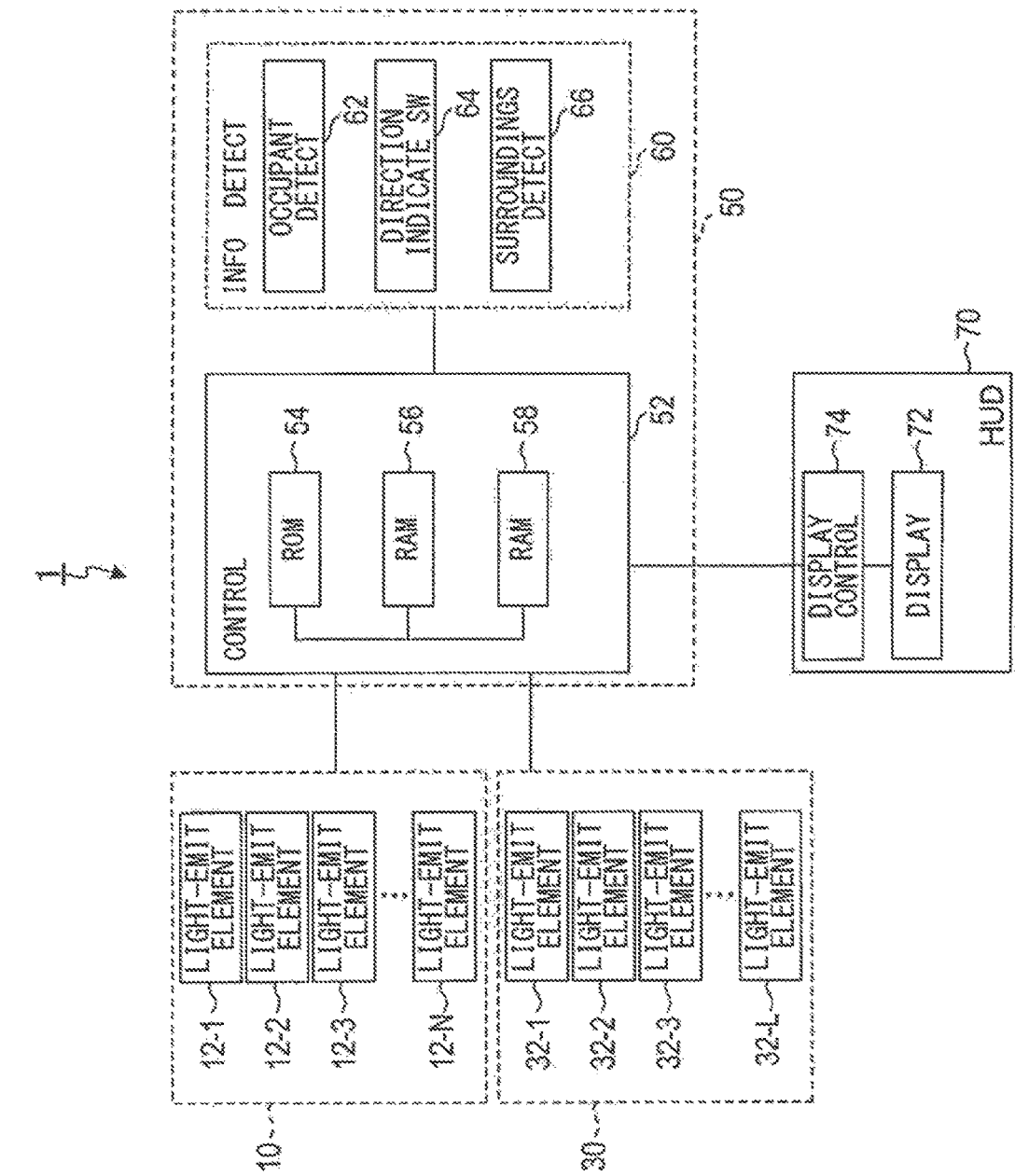
FIG. 1 is a block diagram illustrating an outline configuration of an information providing system including an information providing apparatus according to an embodiment of the present disclosure.

An information providing system 1 in FIG. 1 is an apparatus mounted in an automobile serving as a vehicle. The vehicle mounted with the information providing system 1 may be referred to as a host vehicle.

The information providing system 1 includes light emitters 10, 30, a head-up display 70, and a controller 50 (may be referred to as an electronic control unit or a control system). The information providing system 1 provides various information to an occupant of the vehicle by controlling light emission modes of the light emitters 10, 30 and head-up display 70. The word "information" is used not only as an uncountable noun but also as a countable noun.

Figure 4:
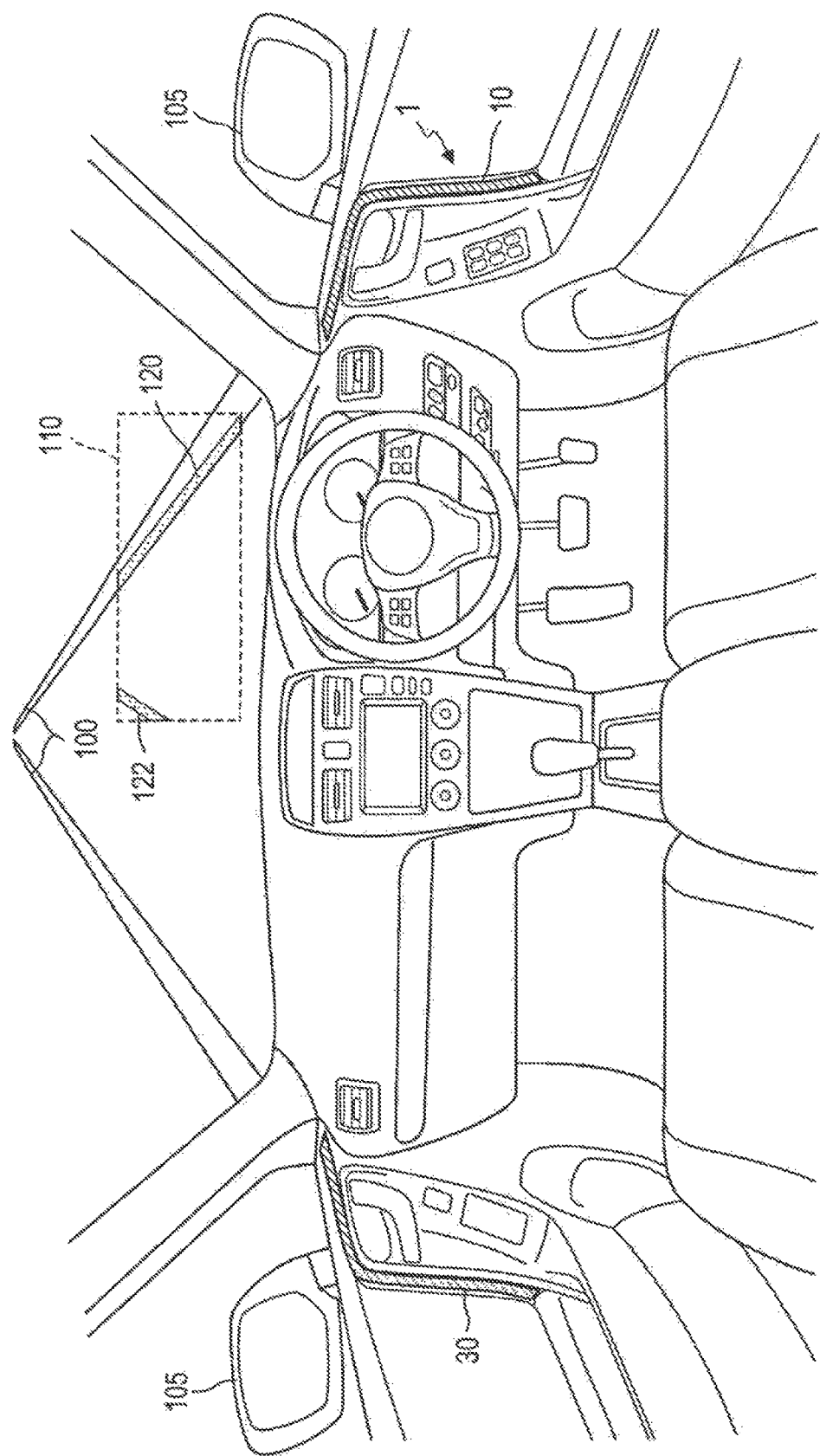
FIG. 4 is a diagram illustrating the positions of light emitters and a projection target member in the embodiment.

The head-up display 70 is a well-known apparatus that displays, as a virtual image, various information reflected from a projection target member 110 (see FIG. 4). The head-up display 70 used in the present embodiment includes a display apparatus 72, a display control apparatus 74, and the projection target member 110.

The projection target member 110 in the embodiment is a part of a vehicle's windshield that exists in a forward visual field of a driver of the vehicle. The forward visual field is a field positioned forward of the vehicle that the driver views during driving. The part of the vehicle's windshield that serves as the projection target member 110 is a part of the windshield that is positioned forward of a driver seat.

The display apparatus 72, which projects light representing information, is arranged to irradiate the projection target member 110 with the light. A liquid-crystal display may be used as the display apparatus 72 in the embodiment. The display control apparatus 74 controls the display apparatus 72 according to control signals from the controller 50.

The projection target member 110 in the present disclosure is not limited to the windshield. A well-known combiner may alternatively be used as the projection target member 110. Preferably, the combiner serving as the projection target member 110 may be arranged within the forward visual field of the driver.

As described, the head-up display 70 forms a virtual image in the forward visual field of the driver by projecting information necessary for vehicle driving onto the projection target member 110. The display apparatus 72 of the head-up display 70 is an example of a second light emitter.

<Light Emitters>

The light emitter 10 includes a plurality of light-emitting elements 12-1 to 12-N. The light-emitting elements 12-1 to 12-N emit light according to control signals from the controller 50. The light-emitting elements 12-1 to 12-N included in the light emitter 10 are arranged on a door on the driver seat side of the vehicle and arranged in at least one line. The symbol "N" is an identifier for identifying the light-emitting elements 12 and indicative of the number of light-emitting elements 12.

The light emitter 30 includes a plurality of light-emitting elements 32-1 to 32-L. The light-emitting elements 32-1 to 32-L emit light according to control signals from the controller 50. The light-emitting elements 32-1 to 32-L included in the light emitter 30 are arranged on a door on the passenger seat side of the vehicle and arranged in at least one line. The symbol "L" is an identifier for identifying the light-emitting elements 32 and indicative of the number of light-emitting elements 32. In the embodiment, the number of light-emitting elements 32 may be equal to or different from the number of light-emitting elements 12.

The light emitter 10 and the light emitter 30 have the same configuration except that they are arranged at different positions. Thus, the embodiment mainly describes the configuration of the light emitter 10 and does not redundantly describe that of the light emitter 30. Reference numerals of elements in the light emitter 30 are parenthesized and attached to the end of reference numerals of elements in the light emitter 10.

Figure 2:
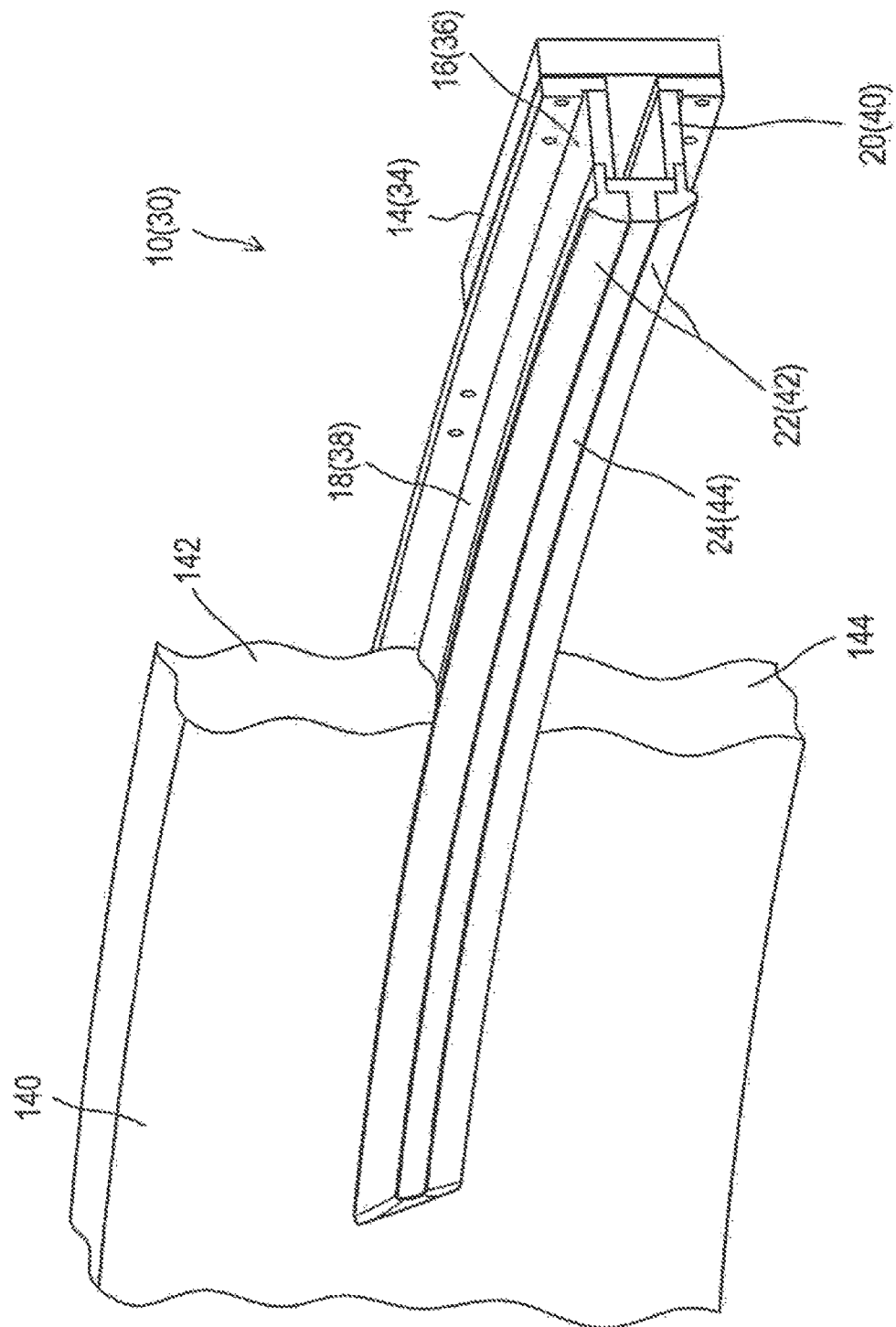
FIG. 2 is a diagram illustrating a configuration of a light emitter.

As in FIG. 2, the light emitter 10 (30) includes a housing 16 (36), a bezel 22 (42), a lens 24 (44), and a light-emitting circuit board 14 (34). The light emitter 10 (30) is in an elongated shape as a whole.

The housing 16 (36) houses a plurality of light-emitting elements 12 (32) and includes a first wall portion 18 (38) and a second wall portion 20 (40). The first wall portion 18 (38) and the second wall portion 20 (40) are arranged with a gap in between. The lens 24 (44) converges or diverges light from the light-emitting elements 12 (32). The bezel 22 (42) secures the lens 24 (44) to the housing 16 (36).

Figure 3:
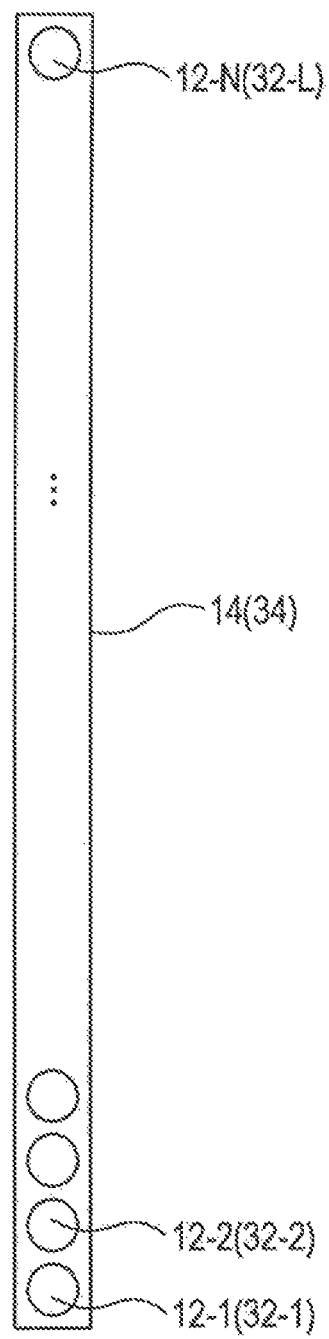
FIG. 3 is a diagram illustrating a light-emitting circuit board.

The light-emitting circuit board 14 (34) in the embodiment is formed in an elongated shape as in FIG. 3. A plurality of light-emitting elements 12 (32) are mounted on a surface of the light-emitting circuit board 14 (34) and arranged in at least one line.

The light-emitting elements 12 (32) in the embodiment are well-known light-emitting diodes that can emit light of three primary colors. However, the light-emitting elements in the present disclosure are not limited to light-emitting diodes. Organic EL elements, electric bulbs, or other light-emitting elements may be alternatively used.

<Arrangement of Light Emitters>

As in FIG. 4, the light emitters 10, 30 are arranged on the vehicle compartment side of a vehicle's front door to be extended from the rear of the vehicle toward "a line marked on a road" 100. Here, the "line marked on a road" 100 is a marking drawn on a road surface to indicate restrictions or instructions. The "line marked on a road" 100 includes a road center line, a lane boundary line, and a road outer line.

The front door includes a driver seat front door, which is a front door on the driver seat side, and a passenger seat front door, which is a front door on the passenger seat side. Specifically, the light emitter 10 is arranged on a door on the driver seat side; the light emitter 30 is arranged on a door on the passenger seat side.

Figure 5:
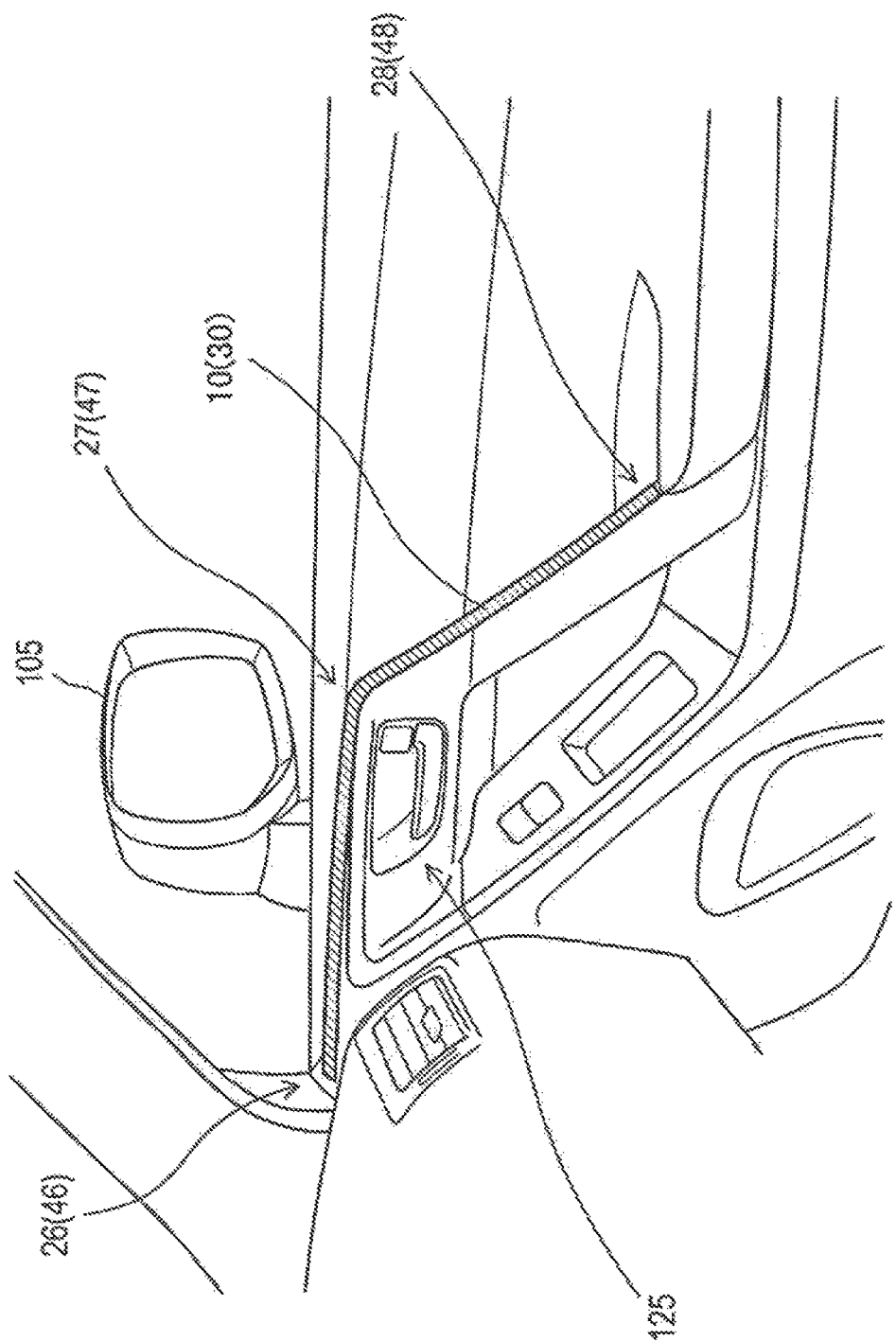
FIG. 5 is a diagram illustrating the positions of the light emitter in the embodiment.

Further, the light emitter 10 (30) in the embodiment is arranged to be bent from the front of the vehicle to the rear as in FIG. 5. More specifically, a front end 26 (46) of the light emitter 10 (30) is arranged near a portion of the front door that is in contact with an A-pillar. Common automobiles are configured to arrange a side view mirror 105 near the portion of the front door that is in contact with the A-pillar.

A portion of the light emitter 10 (30) between the front end 26 (46) and a bend point 27 (47) is arranged along the upper end of a door panel. The portion between the front end 26 (46) and the bend point 27 (47) is arranged so as to be visible as a line serially following the "line marked on a road" 100 when the line-of-sight from an eye point of the driver seated in the driver seat is directed to the "line marked on a road" 100, which is a target to which the line of sight is to be directed. Further, a rear end 28 (48) of the light emitter 10 (30) is arranged at a front end in the overall length direction of an armrest attached to the front door.

In the embodiment, the front end 26 (46) of the light emitter 10 (30) is positioned higher in the vehicle height direction than a door handle 125 on the front door of the vehicle. The reason is that the side view mirror 105 and the projection target member 110 are often positioned higher in the vehicle height direction than the door handle 125 of the vehicle in order to be visible to the driver during driving.

The front end 26 (46) in the embodiment is the front end of the light emitter 10 (30) as viewed in the longitudinal direction of the vehicle. Meanwhile, the rear end 28 (48) is the rear end of the light emitter 10 (30) as viewed in the longitudinal direction of the vehicle. Among the light-emitting elements 12 (32) in the light-emitter 10 (30), the light-emitting element 12 (32) arranged at the front end 26 (46) is hereinafter referred to as the front-end element 12-1 (32-1). Further, among the light-emitting elements 12 (32) in the light-emitter 10 (30), the light-emitting element 12 (32) arranged at the rear end 28 (48) is hereinafter referred to as the rear-end element 12-N (32-L).

The light emitter 10 (30) is sandwiched between a first portion 142 and a second portion 144 (see FIG. 2). The first portion 142 forms at least a part of a door trim 140 on the vehicle compartment side of the front door. The second portion 144 is a portion different from the first portion 142 of the door trim 140. "Sandwiching" may be achieved by positioning the light emitter 10 (30) between a plurality of members of the door trim 140 or by providing one door trim 140 with a concave and mounting the light emitter 10 (30) in the concave. The light emitters 10, 30 in the embodiment are examples of a first light emitter.

<Controller>

The controller 50 in the information providing system 1 includes a control circuit 52 and an information detector 60 (see FIG. 1).

The information detector 60, which may be referred to as an information acquirer, acquires vehicle status indicative of the status of the vehicle and surroundings status indicative of surroundings of the vehicle. The surroundings status acquired by the information detector 60 are examples of status information and acquired surroundings status.

The information detector 60 includes an occupant detection instrument 62 as a vehicle status acquisition mechanism. The occupant detection instrument 62 acquires occupant information indicative of whether an occupant is seated in the passenger seat of the vehicle. The occupant detection instrument 62 in the embodiment may be a mass meter incorporated in the passenger seat or a camera capturing an image of the interior of the vehicle compartment. In the former case, when the mass on the passenger seat is equal to or greater than a threshold value predefined as the weight of a person, it may be determined that an occupant is seated in the passenger seat, and the result of determination may be acquired as the occupant information. In the latter case, a well-known method based on the result of image processing of a captured image may be used to determine whether an occupant is present, and the result of determination may be acquired as the occupant information.

The information detector 60 further includes, as surroundings status acquisition mechanisms, a direction indicator switch (SW) 64 and a surroundings detection instrument 66. The direction indicator switch 64 detects the status of a direction indicator mounted on the vehicle. The surroundings detection instrument 66 detects the surroundings status of the vehicle. The information detector 60 may additionally include well-known switches and sensors such as an ignition switch.

If the direction indicated by the direction indicator switch 64 is a direction toward the driver seat, the information detector 60 acquires direction indication information indicating that the vehicle is scheduled to travel in the direction toward the driver seat. Meanwhile, if a direction toward the passenger seat is indicated by the direction indicator switch 64, the information detector 60 acquires direction indication information indicating that the vehicle is scheduled to travel in the direction toward the passenger seat. Further, if the direction indicated by the direction indicator switch 64 is neither toward the driver seat nor the passenger seat, the information detector 60 acquires direction indication information indicating that the vehicle is scheduled to travel straight forward.

The surroundings detection instrument 66 in the embodiment includes a camera for capturing an image of the surroundings status of the vehicle and a sensing apparatus for sensing the surroundings status of the vehicle. Based on the result of image processing performed on a captured image, the camera acquires a specific object status including the presence of specific objects. The specific objects are objects around the vehicle, such as a different vehicle approaching the host vehicle.

Based on the result of exploration wave transmission and reception, the sensing apparatus detects a specific object status including the presence of specific objects. The specific object status includes the relative positions of a specific object and the host vehicle, the relative speeds of the host vehicle and a specific object, and the physical quantity of a specific object, which indicates its size.

The control circuit 52 is mainly formed of a well-known computer that at least includes a ROM 54, a RAM 56, and a CPU 58. The ROM 54 stores processing programs and data that need to be retained even when the power supply is shut off. The RAM 56 temporarily stores the processing programs and data. The CPU 58 executes various processes according to the processing programs stored in the ROM 54 and the RAM 56.

The ROM 54 stores a processing program that the control circuit 52 uses to execute an information providing process. The information providing process controls at least one of the light emitters 10, 30 and the head-up display 70 so that light emission occurs in a light emission mode associated with the vehicle status and surroundings status acquired by the information detector 60.

That is, the control circuit 52 in the embodiment is an example of an information providing apparatus.

<Information Providing Process>

The information providing process executed by the control circuit 52 will now be described. The information providing process repeatedly starts at predefined time intervals.

It is noted that a flowchart or the processing of the flowchart in the present application includes sections (also referred to as steps), each of which is represented, for instance, as S105. Further, each section can be divided into several sub-sections while several sections can be combined into a single section. Furthermore, each of thus configured sections can be also referred to as a device, module, or a structure-modified name such as an information acquirer or a light emission controller. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

Figure 6:
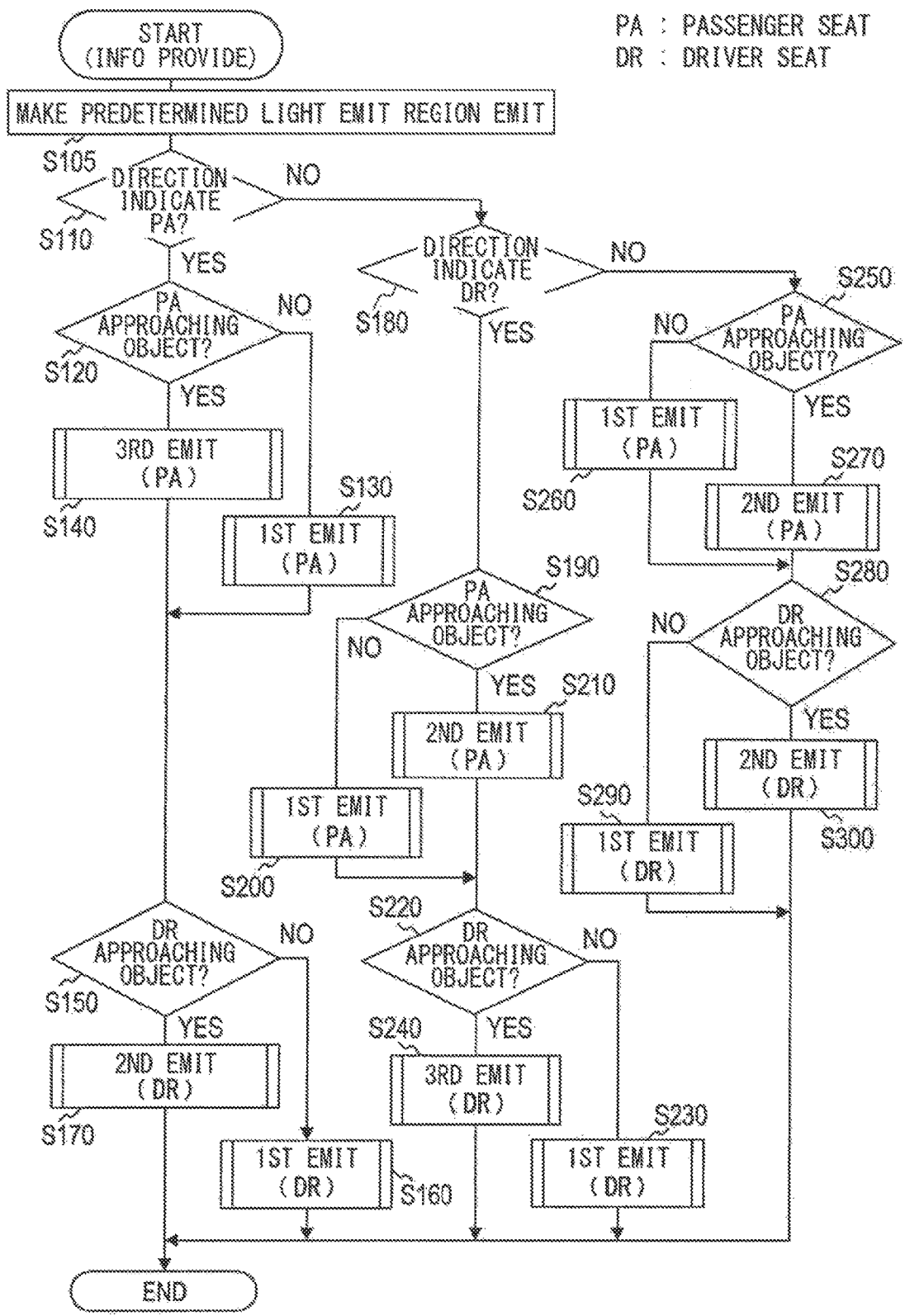
FIG. 6 is a flowchart illustrating processing steps of an information providing process.

When the information providing process in FIG. 6 starts, the control circuit 52 first outputs a control signal to the display control apparatus 74 of the head-up display 70 so as to display "line markings" 120, 122 (see FIG. 4) at a predetermined position on the projection target member 110 (S105). Upon receipt of the control signal, the display control apparatus 74 causes a predefined light emission region of the display apparatus 72 to emit light of a first predefined color.

The predefined light emission region is predefined for the display apparatus 72 so as to display the "line markings" 120, 122 at a predetermined position on the projection target member 110. The "line markings" 120, 122 are lines displayed on the projection target member 110. The predefined light emission region corresponding to the "line marking" 120 on the driver seat side is a region on the display apparatus 72 that is predefined so that at least a part of the line marking 120 overlaps with a "line marking on a road" 100 in the travel direction of the vehicle when the driver views the projection target member 110. Meanwhile, the predefined light emission region corresponding to the "line marking" 122 on the passenger seat side is a region on the display apparatus 72 that is predefined so that the "line marking" 122 is parallel to a "line marking on a road" 100 in the travel direction of the vehicle when the driver views the projection target member 110.

The predefined light emission region of the display apparatus 72 is a region of the display apparatus 72 for projecting light onto a region of the projection target member 110 that forms a line serially following the line of the light-emitting elements 12, 32 forming the light emitters 10, 30. Further, the predefined light emission region of the display apparatus 72 is a region of the display apparatus 72 that corresponds to a region where the "line markings" 120, 122 are displayed by the projection target member 110.

The predefined light emission region of the display apparatus 72 that corresponds to the line marking 120 on the driver seat side will be referred to as the first predefined light emission region. Further, the predefined light emission region of the display apparatus 72 that corresponds to the line marking 122 on the passenger seat side will be referred to as the second predefined light emission region.

In the information providing process, the control circuit 52 causes the information detector 60 to acquire direction indication information, and determines based on the acquired direction indication information whether the vehicle is scheduled to change to a lane on the passenger seat side (S110). In the embodiment, when the direction indication information indicates that the vehicle is scheduled to travel toward the passenger seat side, the control circuit 52 determines that the vehicle is scheduled to change to a lane on the passenger seat side.

If the result of determination in S110 does not indicate that the vehicle is scheduled to change to a lane on the passenger seat side (S110: NO), the control circuit 52 continues with the information providing process by proceeding to S180, which will be described in detail later. By contrast, if he result of determination in S110 indicates that the vehicle is scheduled to change to a lane on the passenger seat side (S110: YES), the control circuit 52 continues with the information providing process by proceeding to S120. In S120, the control circuit 52 acquires specific object status from the surroundings detection instrument 66, and determines based on the acquired specific object status whether a specific object approaching the passenger seat side of the vehicle exists (this specific object is hereinafter referred to as the "passenger seat side approaching object"). If the result of determination in S120 indicates that no passenger seat side approaching object exists (S120: NO), the control circuit 52 executes a first light emission process (S130). The first light emission process is executed to control the light emitter 30 and the head-up display 70 so that light emission occurs in a predefined first light emission mode. The first light emission mode in the embodiment is a light emission mode in which, for example, the light emitters 10, 30 are controlled so that light of the first predefined color (e.g., white) is continuously emitted from all the light-emitting elements 12, 32 within a predefined segment of the light emitters 10, 30. Further, the first light emission mode is a light emission mode in which light of the first predefined color is continuously emitted from the first and second predefined light emission regions of the display apparatus 72.

In the information providing process, the control circuit 52 subsequently proceeds to S150. By contrast, if the result of determination in S120 indicates that a passenger seat side approaching object exists (S120: YES), a third light emission process is executed to control the light emitter 30 and the second predefined light emission region of the display apparatus 72 so as to emit light of in a predefined third light emission mode (S140). The third light emission mode in the embodiment is a light emission mode in which light of a second predefined color (e.g., red), which is different from the first predefined color, is emitted such that an illuminated light-emitting element sequentially changes over time from the rear-end element 12-N, 32-L to the front-end element 12-1, 32-1. Further, the third light emission mode is a light emission mode in which light of the second predefined color is sequentially emitted from the first and second predefined light emission regions of the display apparatus 72 after light emission from the front-end element 12-1, 32-1.

The third light emission process will be described in detail later.

The control circuit 52 continues with the information providing process by proceeding to S150. In S150, the control circuit 52 determines based on the specific object status acquired in S120 whether a specific object approaching the driver seat side of the vehicle exists (this specific object is hereinafter referred to as the "driver seat side approaching object" (e.g., an approaching vehicle)). If the result of determination in S150 indicates that no driver seat side approaching object exists (S150: NO), the control circuit 52 executes the first light emission process to control the light emitter 10 and the head-up display 70 (S160).

Subsequently, the control circuit 52 terminates the information providing process and stands by until the next start time. By contrast, if the result of determination in S150 indicates that a driver seat side approaching object exists (S150: YES), the control circuit 52 executes a second light emission process to control the light emitter 10 and the second predefined light emission region of the display apparatus 72 so that light emission occurs in a predefined second light emission mode (S170). The second light emission mode in the embodiment is a light emission mode in which the light emitters 10, 30 are controlled so that light of a third predefined color, which is different from the first predefined color, is continuously emitted from the light-emitting elements 12, 32 within a predefined segment of the light emitters 10, 30. Further, in the second light emission mode, light of the third predefined color is emitted from the first and second predefined light emission regions of the display apparatus 72.

The second light emission process will be described in detail later. The third predefined color may be equal to or different from the second predefined color.

Subsequently, the control circuit 52 terminates the information providing process and stands by until the next start time.

Meanwhile, in S180 to which processing proceeds if the result of determination in S110 does not indicate that the vehicle is scheduled to change to a lane on the passenger seat side (S110: NO), the control circuit 52 determines based on the direction indication information acquired in S110 whether the vehicle is scheduled to change to a lane on the driver seat side. In the embodiment, if the direction indication information indicates that the vehicle is scheduled to change to a lane on the driver seat side, the control circuit 52 determines that the vehicle is scheduled to change to a lane on the driver seat side.

If the result of determination in S180 does not indicate that the vehicle is scheduled to change to a lane on the driver seat side (S180: NO), the control circuit 52 continues with the information providing process by proceeding to S250, which will be described in detail later.

By contrast, if the result of determination in S180 indicates that the vehicle is scheduled to change to a lane on the driver seat side (S180: YES), the control circuit 52 continues with the information providing process by proceeding to S190. In S190, the control circuit 52 acquires specific object status from the surroundings detection instrument 66, and determines based on the acquired specific object status whether a passenger seat side approaching object exists. If the result of determination in S190 indicates that no passenger seat side approaching object exists (S190: NO), the control circuit 52 executes the first light emission process to control the light emitter 30 and the head-up display 70 (S200). Subsequently, the control circuit 52 continues with the information providing process by proceeding to S220.

By contrast, if the result of determination in S190 indicates that a passenger seat side approaching object exists (S190: YES), the second light emission process is executed to control the light emitter 30 and the second predefined light emission region of the display apparatus 72 (S210). Subsequently, the control circuit 52 continues with the information providing process by proceeding to S220.

In S220, whether a driver seat side approaching object exists is determined based on the specific object status acquired in S190. If the result of determination in S220 indicates that no driver seat side approaching object exists (S220: NO), the control circuit 52 executes the first light emission process to control the light emitter 10 and the head-up display 70 (S230). Subsequently, the control circuit 52 terminates the information providing process and stands by until the next start time.

By contrast, if the result of determination in S220 indicates that a driver seat side approaching object exists (S220: YES), the third light emission process is executed to control the light emitter 10 and the first predefined light emission region of the display apparatus 72 (S240). Subsequently, the control circuit 52 terminates the information providing process and stands by until the next start time.

In S250 to which processing proceeds if the result of determination in S180 does not indicate that the vehicle is scheduled to change to a lane on the driver seat side (S180: NO), the control circuit 52 acquires specific object status from the surroundings detection instrument 66, and determines based on the acquired specific object status whether a passenger seat side approaching object exists. If the result of determination in S250 indicates that no passenger seat side approaching object exists (S250: NO), the control circuit 52 executes the first light emission process to control the light emitter 30 and the head-up display 70 (S260). Subsequently, the control circuit 52 continues with the information providing process by proceeding to S280.

By contrast, if the result of determination in S250 indicates that a passenger seat side approaching object exists (S250: YES), the control circuit 52 executes the second light emission process to control the light emitter 30 and the second predefined light emission region of the display apparatus 72 (S270). Subsequently, the control circuit 52 continues with the information providing process by proceeding to S280.

In S280, the control circuit 52 determines based on the specific object status acquired in S250 whether a driver seat side approaching object exists. If the result of determination in S280 indicates that no driver seat side approaching object exists (S280: NO), the control circuit 52 executes the first light emission process to control the light emitter 10 and the head-up display 70 (S290). Subsequently, the control circuit 52 terminates the information providing process and stands by until the next start time.

If the result of determination in S280 indicates that a driver seat side approaching object exists (S280: YES), the second light emission process is executed to control the light emitter 10 and the first predefined light emission region of the display apparatus 72 (S300). Subsequently, the control circuit 52 terminates the information providing process and stands by until the next start time.

<Second Light Emission Process>

The second light emission process, which is executed in S170, S210, S270, and S300 of the information providing process, will now be described. Depending on the start time, the second light emission process in the embodiment controls either the light emitter 10 and the first predefined light emission region of the display apparatus 72 or the light emitter 30 and the second predefined light emission region of the display apparatus 72. However, the same process is executed in either case without regard to the start time. Therefore, these two cases will be described together.

Figure 7:
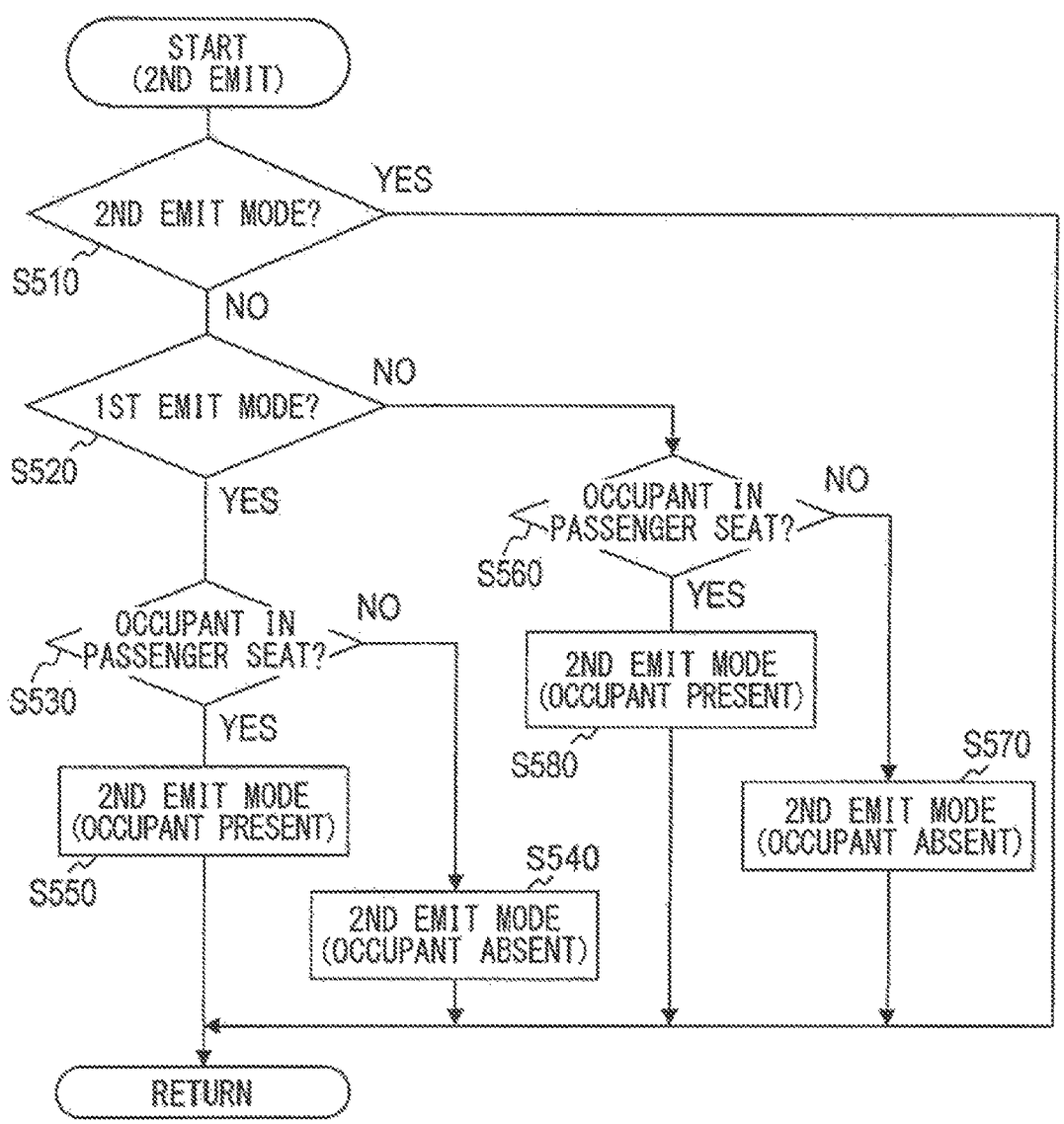
FIG. 7 is a flowchart illustrating processing steps of a second light emission process.

When the second light emission process in FIG. 7 starts, the control circuit 52 determines whether a current light emission mode of control targets, namely, the light emitter 10 and the first predefined light emission region of the display apparatus 72 or the light emitter 30 and the second predefined light emission region of the display apparatus 72, is the second light emission mode (S510). If the result of determination in S510 indicates that the current light emission mode is the second light emission mode (S510: YES), the control circuit 52 leaves the control targets in the second light emission mode, terminates the second light emission process, and returns to the information providing process.

By contrast, if the result of determination in S510 does not indicate that the current light emission mode is the second light emission mode (S510: NO), the control circuit 52 determines whether the current light emission mode is the first light emission mode (S520). If the result of this determination does not indicate that the current light emission mode is the first light emission mode (S520: NO), that is, indicates that the current light emission mode is the third light emission mode, the control circuit 52 continues with the second light emission process by proceeding to S560, which will be described in detail later.

If the result of determination in S520 indicates that the current light emission mode is the first light emission mode (S520: YES), the control circuit 52 continues with the second light emission process by proceeding to S530. In S530, the control circuit 52 acquires occupant information from the occupant detection instrument 62, and determines based on the acquired occupant information whether an occupant is seated in the passenger seat.

If the result of determination in S530 indicates that no occupant is seated in the passenger seat (S530: NO), the control circuit 52 controls the control targets so that light emission occurs in an occupant absent mode, which is a submode of the second light emission mode (S540). In the occupant absent mode of the second light emission mode according to the embodiment, the control circuit 52 regards, for example, a segment between the front end 26, 46 and the bend point 27, 47 of the control targets as a predefined segment, and controls the control targets so that all the light-emitting elements 12, 32 arranged in the predefined segment emit light of the third predefined color. Further, in the occupant absent mode of the second light emission mode according to the embodiment, the control circuit 52 exercises control so that the first or second predefined light emission region of the display apparatus 72 emits light of the third predefined color.

The control circuit 52 terminates the second light emission process and returns to the information providing process. By contrast, if the result of determination in S530 indicates that an occupant is seated in the passenger seat (S530: YES), the control circuit 52 controls the control targets so that light emission occurs in an occupant present mode, which is a submode of the second light emission mode (S550). If the control targets are the light emitter 30 and the second predefined light emission region of the display apparatus 72, the occupant present mode of the second light emission mode according to the embodiment regards a predefined occupant present specific segment within the segment between the front end 46 and the bend point 47 as the predefined segment, and allows the control circuit 52 to control the light emitter 30 so that all the light-emitting elements 32 arranged in the occupant present specific segment emit light of the third predefined color. Further, the occupant present mode of the second light emission mode exercises control so that the second predefined light emission region of the display apparatus 72 emits light of the third predefined color.

If the control targets are the light emitter 10 and the first predefined light emission region of the display apparatus 72, the control circuit 52 may regard a segment between the front end 26 and the bend point 27 as the predefined segment, as is the case with the occupant absent mode, and exercise control so that all the light-emitting elements 12 arranged in the predefined segment emit light of the third predefined color. However, if the light emitter 10 is to be controlled, the control circuit 52 may exercise control so that all the light-emitting elements arranged in the occupant present specific segment emit light of the third predefined color, as is the case with the occupant present mode. The occupant present specific segment corresponds to a driver's visual field from an eyepoint of the vehicle's driver seat. It may be the whole segment between the front end 46 (26) and the bend point 47 (27) or a part of the segment extended from the front end 46 (26). Further, the occupant present mode of the second light emission mode exercises control so that the first predefined light emission region of the display apparatus 72 emits light of the third predefined color.

The control circuit 52 terminates the second light emission process and returns to the information providing process. Meanwhile, in S560 to which processing proceeds if the result of determination in S520 does not indicate that the current light emission mode is the first light emission mode (S520: NO), the control circuit 52 acquires occupant information from the occupant detection instrument 62, and determines based on the acquired occupant information whether an occupant is seated in the passenger seat.

If the result of determination in S560 indicates that no occupant is seated in the passenger seat (S560: NO), the control circuit 52 controls the control targets so that light emission occurs in the occupant absent mode of the second light emission mode (S570). Subsequently, the control circuit 52 terminates the second light emission process and returns to the information providing process.

If the result of determination in S560 indicates that an occupant is seated in the passenger seat (S560: YES), the control circuit 52 controls the control targets so that light emission occurs in the occupant present mode of the second light emission mode (S580). Subsequently, the control circuit 52 terminates the second light emission process and returns to the information providing process.

<Third Light Emission Process>

The third light emission process, which is executed in S140 and S240 of the information providing process, will now be described. Depending on the start time, the third light emission process in the embodiment controls either the light emitter 10 and the first predefined light emission region of the display apparatus 72 or the light emitter 30 and the second predefined light emission region of the display apparatus 72. However, the same process is executed in either case without regard to the start time. Therefore, these two cases will be described together.

Figure 8:
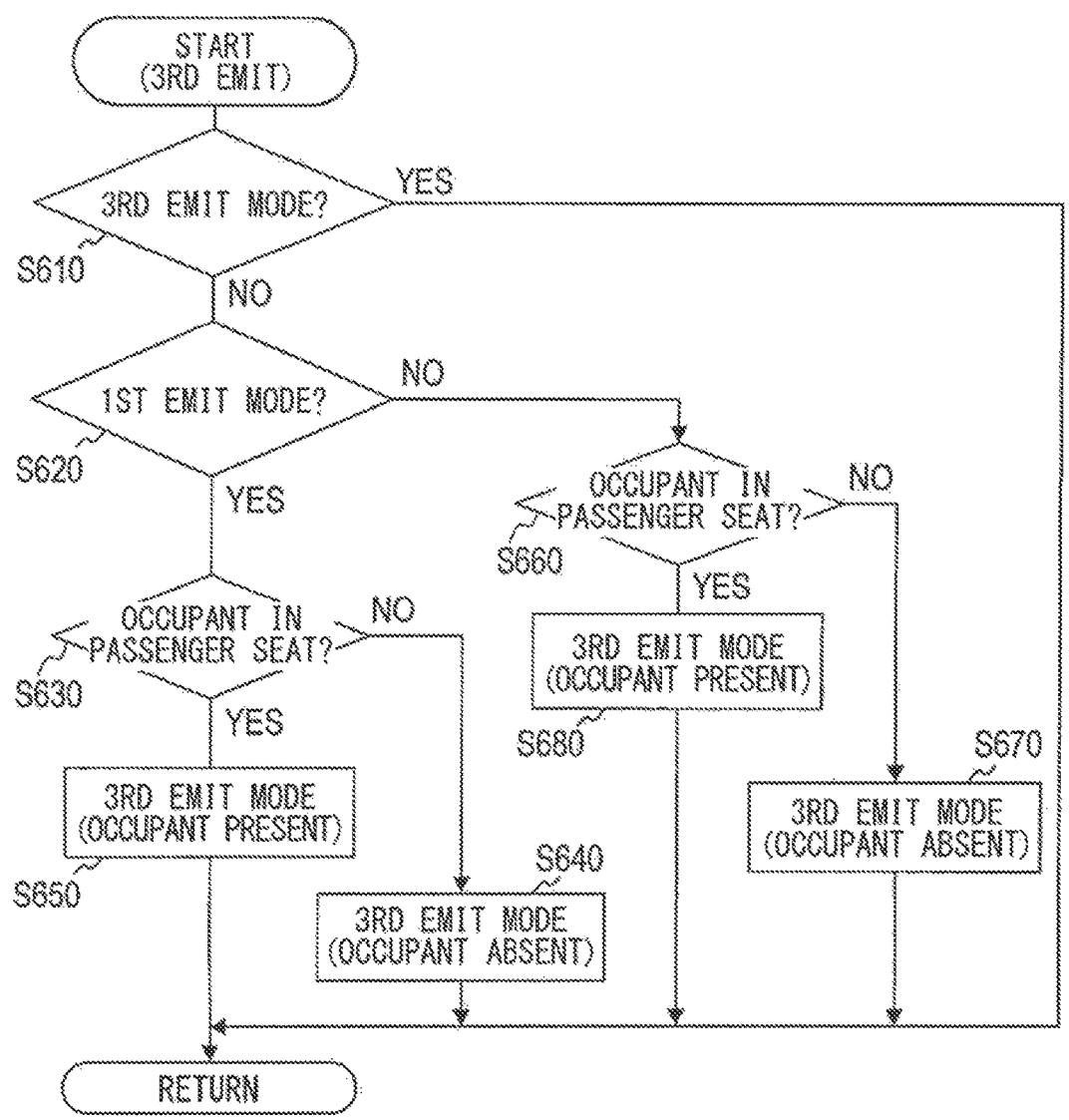
FIG. 8 is a flowchart illustrating processing steps of a third light emission process.

When the third light emission process in FIG. 8 starts, the control circuit 52 determines whether the current light emission mode of control targets is the third light emission mode (S610). If the result of determination in S610 indicates that the current light emission mode is the third light emission mode (S610: YES), the control circuit 52 leaves the control targets in the third light emission mode, terminates the third light emission process, and returns to the information providing process.

By contrast, if the result of determination in S610 does not indicate that the current light emission mode is the third light emission mode (S610: NO), the control circuit 52 determines whether the current light emission mode is the first light emission mode (S620). If the result of this determination does not indicate that the current light emission mode is the first light emission mode (S620: NO), that is, indicates that the current light emission mode is the second light emission mode, the control circuit 52 continues with the third light emission process by proceeding to S660, which will be described in detail later.

If the result of determination in S620 indicates that the current light emission mode is the first light emission mode (S620: YES), the control circuit 52 continues with the third light emission process by proceeding to S630. In S630, the control circuit 52 acquires occupant information from the occupant detection instrument 62, and determines based on the acquired occupant information whether an occupant is seated in the passenger seat.

If the result of determination in S630 indicates that no occupant is seated in the passenger seat (S630: NO), the control circuit 52 controls the control targets so that light emission occurs in an occupant absent mode, which is a submode of the third light emission mode (S640).

Figure 9:
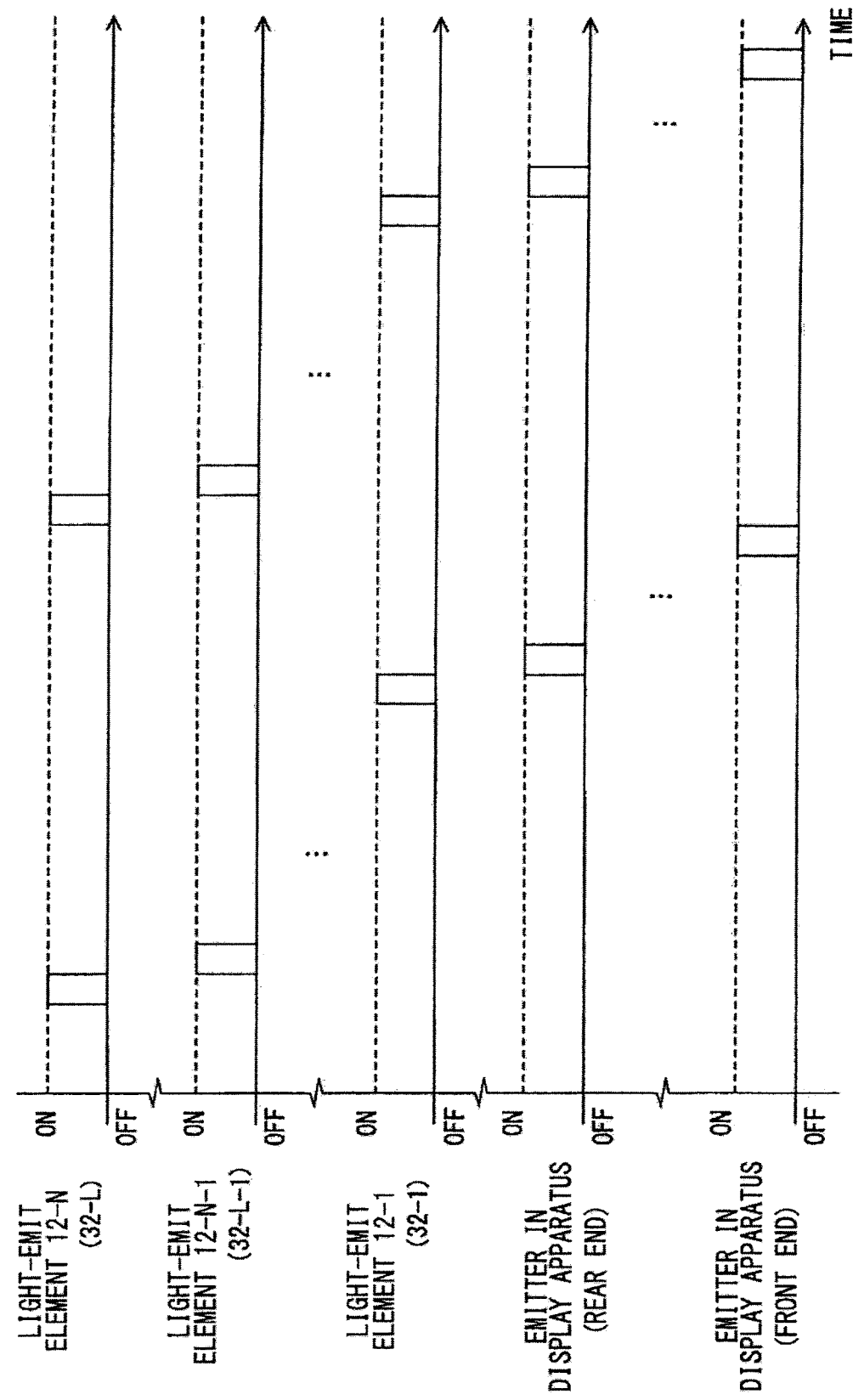
FIG. 9 is a timing diagram illustrating how to change a target from which light is emitted in the third light emission mode.

In the occupant absent mode of the third light emission mode according to the embodiment, the control circuit 52 causes the light-emitting elements 12, 32 of the control targets to sequentially emit light of the second predefined color in order from the rear-end element 12-N, 32-L to the front-end element 12-1, 32-1, as in FIG. 9. Further, in the occupant absent mode of the third light emission mode according to the embodiment, the control circuit 52 exercises control so that the first and second predefined light emission regions of the display apparatus 72 sequentially emit light of the second predefined color after light emission from the front-end element 12-1, 32-1. Light emission in the third light emission mode from the first and second predefined light emission regions occurs as sequentially changing from the rear of the vehicle to the front in the travel direction of the vehicle.

In the occupant absent mode of the third light emission mode, a sequence of changing a target, from which light is emitted, from the rear-end element 12-N, 32-L to the vehicle's front end in the first and second predefined light emission regions of the display apparatus 72 is then repeated a predefined number of times.

In the occupant absent mode of the third light emission mode according to the embodiment, the time required for changing the emission of light of the second predefined color from the front-end element 12-1, 32-1 to the vehicle's rear end in the first and second predefined light emission regions of the display apparatus 72 is the time required for changing the emission of light of the second predefined color from the light-emitting elements 12, 32 forming a light-emitting element set.

A target sequentially changed to emit light of the second predefined color is hereinafter referred to as a light-emitting target 130. The light-emitting target 130 includes the light-emitting element set formed of a plurality of light-emitting elements 12, 32 arranged adjacent to each other and light emitters in the predefined light emission regions of the display apparatus 72. Particularly, the light-emitting element set serving as the light-emitting target 130 is not limited to a plurality of light-emitting elements 12, 32 arranged adjacent to each other, but may be a single light-emitting element 12, 32 or a specific arrangement pattern formed of a plurality of light-emitting elements 12, 32.

Further, in the embodiment, the light emission status of the light-emitting target 130 to be controlled may be changed based on the physical quantity of a specific object. The "light emission status" includes the on/off status (illuminated or extinguished) of the light-emitting elements 12, 32, the number of illuminated light-emitting elements 12, 32, the number of extinguished light-emitting elements 12, 32, and the light emission intensity, light emission color, and light emission time of illuminated light-emitting elements 12, 32.

Figure 10:
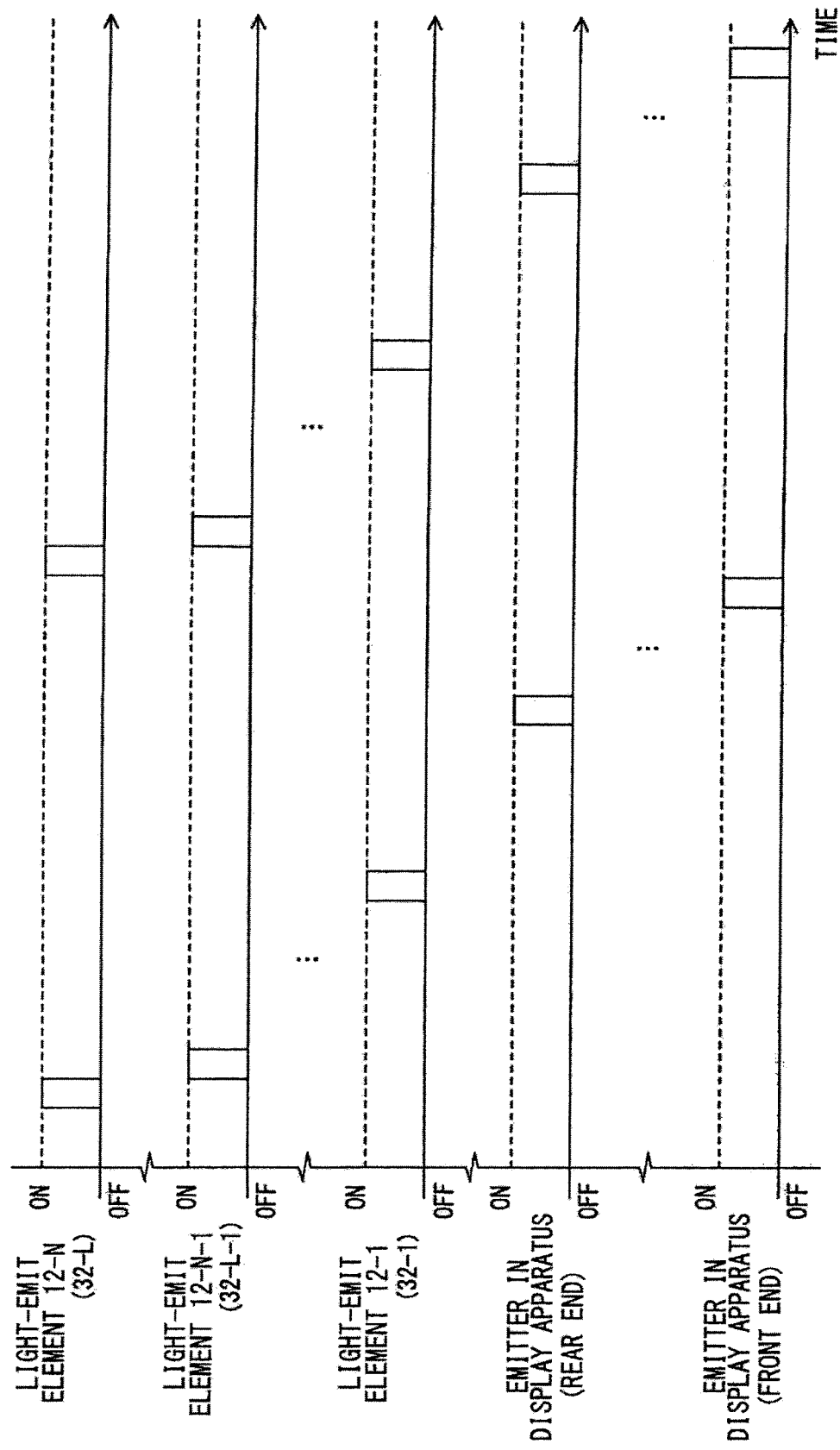
FIG. 10 is a modified timing diagram illustrating how to change a target from which light is emitted in the third light emission mode.

However, in the occupant absent mode of the third light emission mode, the time of light emission in the second predefined color from the first and second predefined light emission regions of the display apparatus 72 (hereinafter referred to as the display start time) is not limited to the time in FIG. 9. That is, the start of display may be timed at a point when a predefined period of time elapses after light emission from the front-end element 12-1, 32-1 as in FIG. 10. The predefined period of time is as described below. Let us first assume that the light-emitting target 130 exists between the front-end element 12-1, 32-1 and the vehicle side rear end of the "line markings" 120, 122 on the projection target member 110. The predefined period of time may be regarded as the time required when the presumably existing light-emitting target 130 is operated to sequentially let the light-emitting elements 12, 32 forming the light-emitting element set successively emit light of the second predefined color.

Subsequently, the control circuit 52 terminates the third light emission process and returns to the information providing process. Meanwhile, if the result of determination in S630 indicates that an occupant is seated in the passenger seat (S630: YES), the control circuit 52 controls the control targets so that light emission occurs in an occupant present mode, which is a submode of the third light emission mode (S650).

If the light emitter 30 is to be controlled in the occupant present mode of the third light emission mode, the light-emitting target 130 handled by the control circuit 52 corresponds to a light-emitting element set formed of light-emitting elements 32 arranged in each of a plurality of segments into which the whole segment between the rear end 48 and the front end 46 is divided. The control circuit 52 exercises control so that the light-emitting target 130 emits light in the same light emission mode as the occupant absent mode of the third light emission mode. Further, in the occupant present mode of the third light emission mode, the control circuit 52 causes the front-end element 32-1 to emit light, and then causes the elements in the second predefined light emission region of the display apparatus 72 to sequentially emit light of the second predefined color. The light emission in the third light emission mode from the second predefined light emission region is executed as sequentially changing from the rear of the vehicle to the front in the travel direction of the vehicle.

If the light emitter 10 is to be controlled, an occupant present light emission segment within the whole segment between the rear end 28 and the front end 26 may be controlled in the same manner as in the occupant absent mode. Alternatively, the whole segment between the rear end 28 and the front end 26 may be controlled in the same manner as in the occupant absent mode. The occupant present light emission segment corresponds to a driver's visual field from an eyepoint of the vehicle's driver seat. It may be the whole segment between the front end 26 and the rear end 28 or a predefined segment extended from the front end 26.

In the occupant present mode of the third light emission mode according to the embodiment, the control circuit 52 causes the front-end element 12-1 to emit light, and then causes the elements in the first predefined light emission region of the display apparatus 72 to sequentially emit light of the second predefined color. The light emission in the third light emission mode from the first predefined light emission region is executed as sequentially changing from the rear of the vehicle to the front in the travel direction of the vehicle.

The control circuit 52 terminates the third light emission process and returns to the information providing process. Meanwhile, in S660 to which processing proceeds if the result of determination in S620 does not indicate that the current light emission mode of the control targets is the first light emission mode (S620: NO), the control circuit 52 acquires occupant information from the occupant detection instrument 62, and determines based on the acquired occupant information whether an occupant is seated in the passenger seat.

If the result of determination in S660 indicates that no occupant is seated in the passenger seat (S660: NO), the control circuit 52 controls the control targets so that light emission occurs in the occupant absent mode of the third light emission mode (S670). Subsequently, the control circuit 52 terminates the third light emission process and returns to the information providing process.

If the result of determination in S660 indicates that an occupant is seated in the passenger seat (S660: YES), the control circuit 52 controls the control targets so that light emission occurs in the occupant present mode of the third light emission mode (S680). Subsequently, the control circuit 52 terminates the third light emission process and returns to the information providing process.

In the third light emission process, the third light emission mode emits light of the second predefined color as sequentially changing from the rear-end element 12-N, 32-L to the front-end element 12-1, 32-1 as in FIG. 11. Further, in the third light emission mode, the control circuit 52 causes the front-end element 12-1, 32-1 to emit light, and then causes the first and second predefined light emission regions of the display apparatus 72 to sequentially emit light of the second predefined color. The light emission in the third light emission mode from the first and second predefined light emission regions is executed as sequentially changing from the rear of the vehicle to the front in the travel direction of the vehicle.

At (A) to (H) in FIG. 11, the light-emitting target 130 sequentially changes over time from the rear-end element 12-N, 32-L to the front-end element 12-1, 32-1 and then to the vehicle's front end of a predefined light emission region of the display apparatus 72.

Figure (A) of FIG. 11 illustrates the projection target member 110 in a situation where the rear-end element 12-N, 32-L is the light-emitting target 130. Figure (B) of FIG. 11 illustrates a situation where the rear-end element 12-N, 32-L emits light of the second predefined color. Figures (D), (F), and (H) of FIG. 11 illustrate how the light-emitting target 130 sequentially changes over time from the rear-end element 12-N, 32-L to the front-end element 12-1, 32-1. Figures (C), (E), and (G) illustrate the projection target member 110 at certain points of time in order to indicate that a predefined light emission region of the display apparatus 72 serves as the light-emitting target 130 over time. However, figures (A) and (B) illustrate a situation at the same point of time, and figures (C) and (D) illustrate a situation at the same point of time. Further, figures (E) and (F) illustrate a situation at the same point of time, and figures (G) and (H) illustrate a situation at the same point of time.

The third light emission mode is an example of a transitional light emission mode.

<First Light Emission Process>

The first light emission process, which is executed in S130, S160, S200, S230, S260, and S300 of the information providing process, will now be described. Depending on the start time, the first light emission process in the embodiment controls either the light emitter 10 and the display apparatus 72 of the head-up display 70 or the light emitter 30 and the display apparatus 72 of the head-up display 70. However, the same process is executed in either case without regard to the start time. Therefore, these two cases will be described together.

Figure 12:
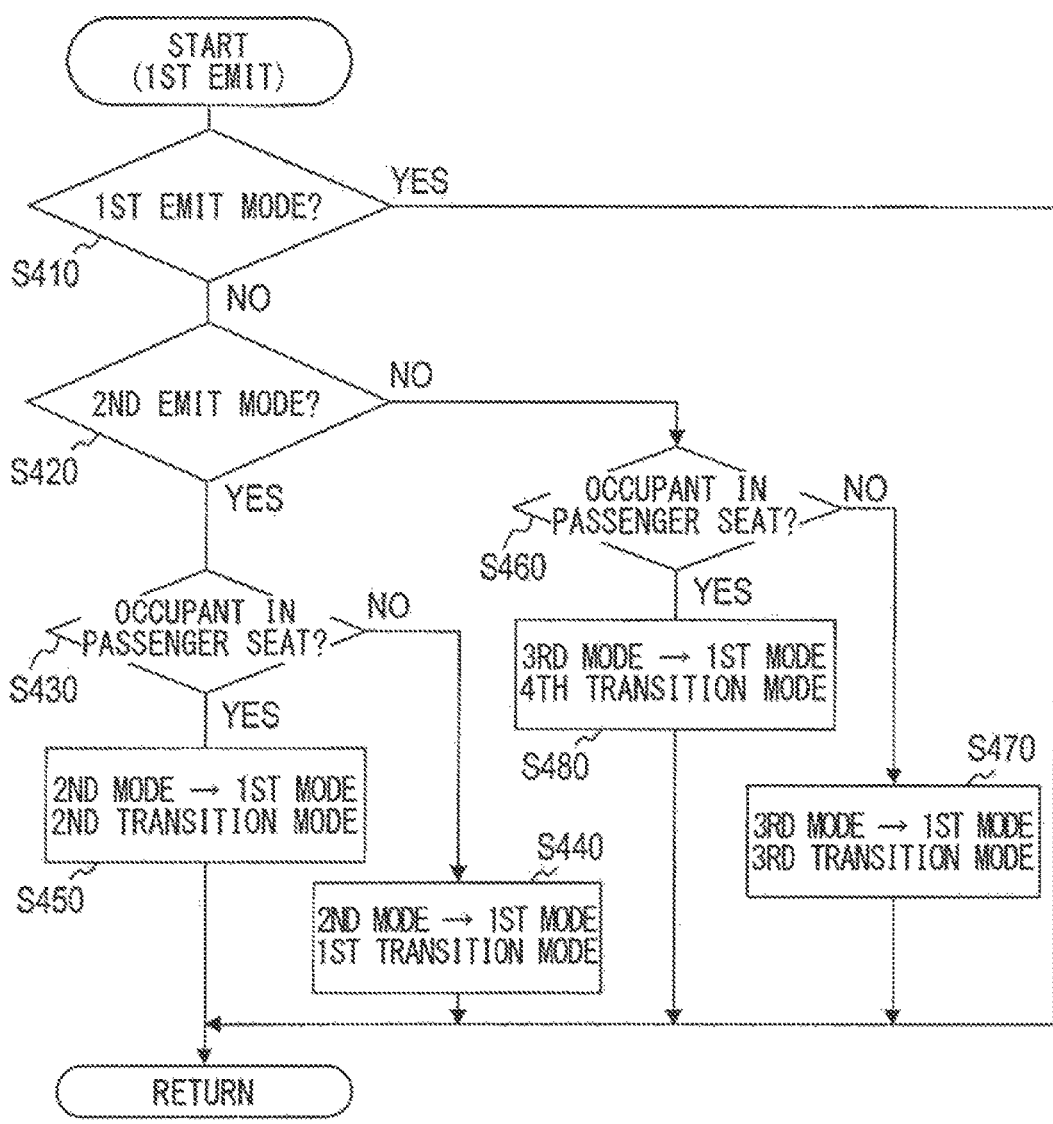
FIG. 12 is a flowchart illustrating processing steps of a first light emission process.

When the first light emission process starts as in FIG. 12, the control circuit 52 determines whether the current light emission mode of control targets is the first light emission mode (S410). If the result of determination in S410 indicates that the current light emission mode is the first light emission mode (S410: YES), the control circuit 52 leaves the control targets in the first light emission mode, terminates the first light emission process, and returns to the information providing process.

By contrast, if the result of determination in S410 does not indicate that the current light emission mode is the first light emission mode (S410: NO), the control circuit 52 determines whether the current light emission mode of the control targets is the second light emission mode (S420). If the result of this determination does not indicate that the current light emission mode is the second light emission mode (S420: NO), that is, indicates that the current light emission mode is the third light emission mode, the control circuit 52 continues with the first light emission process by proceeding to S460, which will be described in detail later.

If the result of determination in S420 indicates that the current light emission mode is the second light emission mode (S420: YES), the control circuit 52 continues with the first light emission process by proceeding to S430. In S430, the control circuit 52 acquires occupant information from the occupant detection instrument 62, and determines based on the acquired occupant information whether an occupant is seated in the passenger seat.

If the result of determination in S430 indicates that no occupant is seated in the passenger seat (S430: NO), the control circuit 52 controls the control targets so that light emission occurs in a first transition mode (S440). The first transition mode is one of modes for changing the light emission mode of a control target from the second light emission mode to the first light emission mode within a predefined period of time.

The first transition mode according to the embodiment causes changes during a predefined period of time so that all the light-emitting elements 12, 32 arranged within a predefined segment of the light emitters 10, 30, which are to be controlled, emit light of the first predefined color. The predefined segment may be between the front end 26, 46 and the bend point 27, 47 or between the front end 26, 46 and the rear end 28, 48. Further, the first transition mode causes changes during the predefined period of time so that the first and second predefined light emission regions of the display apparatus 72, which is to be controlled, emit light of the first predefined color.

The control circuit 52 terminates the first light emission process and returns to the information providing process. Meanwhile, if the result of determination in S430 indicates that an occupant is seated in the passenger seat (S430: YES), the control circuit 52 controls the light emitter 10 or the light emitter 30 so that light emission occurs in a second transition mode (S450). The second transition mode is one of modes for changing the light emission mode of a control target from the second light emission mode to the first light emission mode.

The second transition mode according to the embodiment causes changes during a predefined period of time so that all the light-emitting elements 12, 32 arranged within a predefined segment of the light emitters 10, 30, which are to be controlled, emit light of the first predefined color. Further, the second transition mode causes changes during the predefined period of time so that the first and second predefined light emission regions of the display apparatus 72, which is to be controlled, emit light of the first predefined color.

The control circuit 52 terminates the first light emission process and returns to the information providing process. Meanwhile, in S460 to which processing proceeds if the result of determination in S420 does not indicate that the current light emission mode is the second light emission mode (S420: NO), the control circuit 52 acquires occupant information from the occupant detection instrument 62, and determines based on the acquired occupant information whether an occupant is seated in the passenger seat.

If the result of determination in S460 indicates that no occupant is seated in the passenger seat (S460: NO), the control circuit 52 controls the control targets so that light emission occurs in a third transition mode (S470). The third transition mode is one of modes for changing the light emission mode of a control target from the third light emission mode to the first light emission mode.

The third transition mode causes changes during a predefined period of time so that all the light-emitting elements 12, 32 arranged within a predefined segment of the light emitters 10, 30, which are to be controlled, emit light of the first predefined color. Further, the third transition mode causes changes during the predefined period of time so that the first and second predefined light emission regions of the display apparatus 72, which is to be controlled, emit light of the first predefined color.

Subsequently, the control circuit 52 terminates the first light emission process and returns to the information providing process. Meanwhile, if the result of determination in S460 indicates that an occupant is seated in the passenger seat (S460: YES), the control circuit 52 controls the control targets so that light emission occurs in a fourth transition mode (S480). The fourth transition mode is one of modes for changing the light emission mode of a control target from the third light emission mode to the first light emission mode.

The fourth transition mode according to the embodiment causes changes during a predefined period of time so that all the light-emitting elements 12, 32 arranged within a predefined segment of the light emitters 10, 30, which are to be controlled, emit light of the first predefined color. Further, the fourth transition mode causes changes during the predefined period of time so that the first and second predefined light emission regions of the display apparatus 72, which is to be controlled, emit light of the first predefined color. Subsequently, the control circuit 52 terminates the first light emission process and returns to the information providing process.

The control circuit 52 functions as an information acquisition section or an information acquirer in S110, S120, S150, S180, S190, S250, and S280. Further, the control circuit 52 functions as a light emission control section or a light emission controller in S130, S140, S160, S170, S200, S210, S230, S240, S260, S270, S290, and S300.

[Advantageous Effects of Embodiment]

As described, the information providing system 1 uses a single light emission mechanism, which is formed of the light emitters 10, 30 arranged on front doors of a vehicle and the display apparatus 72 of the head-up display 70 mounted in the vehicle, in order to emit light in a mode that varies with the surroundings status.

When the acquired surroundings status meet the predefined conditions, the information providing process for controlling the light emission mode controls the light emitters 10, 30 and the display apparatus 72 of the head-up display 70 in the third light emission mode. The third light emission mode exercises control so that a target, from which light is emitted, transitions from the rear-end element 12-N, 32-L through the front-end element 12-1, 32-1 to a predefined light emission region of the display apparatus 72, that is, the "line marking" 120, 122 displayed on the projection target member 110.

Consequently, when information about the surroundings status meets the predefined conditions, the information providing process is able to smoothly direct the line-of-sight of an occupant to the projection target member 110.

The information providing process assumes that the predefined conditions are met by the information about the surroundings status when the vehicle travels toward a specific object. Thus, the information providing process is able to indicate that the specific object exists in the travel direction of the vehicle.

Hence, the information providing system 1 can control the light emitters 10, 30 and the display apparatus 72 of the head-up display 70 in a coordinated manner. Further, the information providing system 1 is able to provide information about the surroundings status of the vehicle by controlling the light emitters 10, 30 and the display apparatus 72 of the head-up display 70 in the coordinated manner.

Consequently, even when a plurality of information providing apparatuses are mounted in a vehicle, the information providing system 1 is able to reduce the possibility of identical information being provided from the apparatuses at different points of time and suppress the probability of a vehicle occupant becoming confused about which apparatus is reliable as the source of information. Further, even when a plurality of information providing apparatuses are mounted in a vehicle, the information providing system 1 is able to reduce the possibility of identical information being provided at the same time and suppress the probability of the vehicle occupant becoming confused about which apparatus should be selected as the source of information.

When a plurality of information providing apparatuses are mounted in a vehicle, the control circuit 52 is able to provide increased user-friendliness. Further, the control circuit 52 controls the light emission operations of two systems, namely, the light emitters 10, 30 and the display apparatus 72 of the head-up display 70. Therefore, the amount of information to be provided to an occupant of the vehicle can be increased.

The light emitters 10, 30 according to the embodiment are configured so that the forward ends (i.e., front ends) of a plurality of light-emitting elements 12, 32 linearly arranged to form the light emitters 10, 30 are positioned higher in the vehicle height direction than the door handles of the vehicle.

The information providing system 1 permits a driver of the vehicle to view illuminated light-emitting elements 12, 32 in the light emitters 10, 30 without significantly changing the line of sight during driving. Thus, the information providing system 1 is able to direct the driver's line of sight toward the side view mirror 105 or the projection target member 110 with small line-of-sight movement.

[Alternative Embodiments]

While an embodiment of the present disclosure has been described, the present disclosure is not limited to the above-described embodiment. It is obvious that the present disclosure may be implemented in various other embodiments without departing from the spirit and scope of the present disclosure.

In the foregoing embodiment, the predefined light emission region of the display apparatus 72 is a region of the display apparatus 72 for projecting light onto a region of the projection target member 110 that forms a line serially following the line of the light-emitting elements 12, 32 forming the light emitters 10, 30, and is a region of the display apparatus 72 that corresponds to a region where the "line markings" 120, 122 are displayed by the projection target member 110. However, the predefined light emission region according to the present disclosure is not limited to such a region. The predefined light emission region according to the present disclosure may be a region of the display apparatus 72 for projecting light onto a periphery 132 of the projection target member 110 at (A) in FIG. 13 or a region of the display apparatus 72 for projecting light onto at least one edge portion 134 of the projection target member 110 at (B) in FIG. 13.

Even when the predefined light emission region is as described, the line-of-sight of a user can be moved to the projection target member 110. Particularly when the predefined light emission region is a region of the display apparatus 72 that projects light onto at least one edge portion 134 of the projection target member 110, a gradation light emission mode may be employed as the light emission mode of the predefined light emission region so that brightness decreases with a decrease in the distance to the center of the display apparatus 72.

Figure 14:
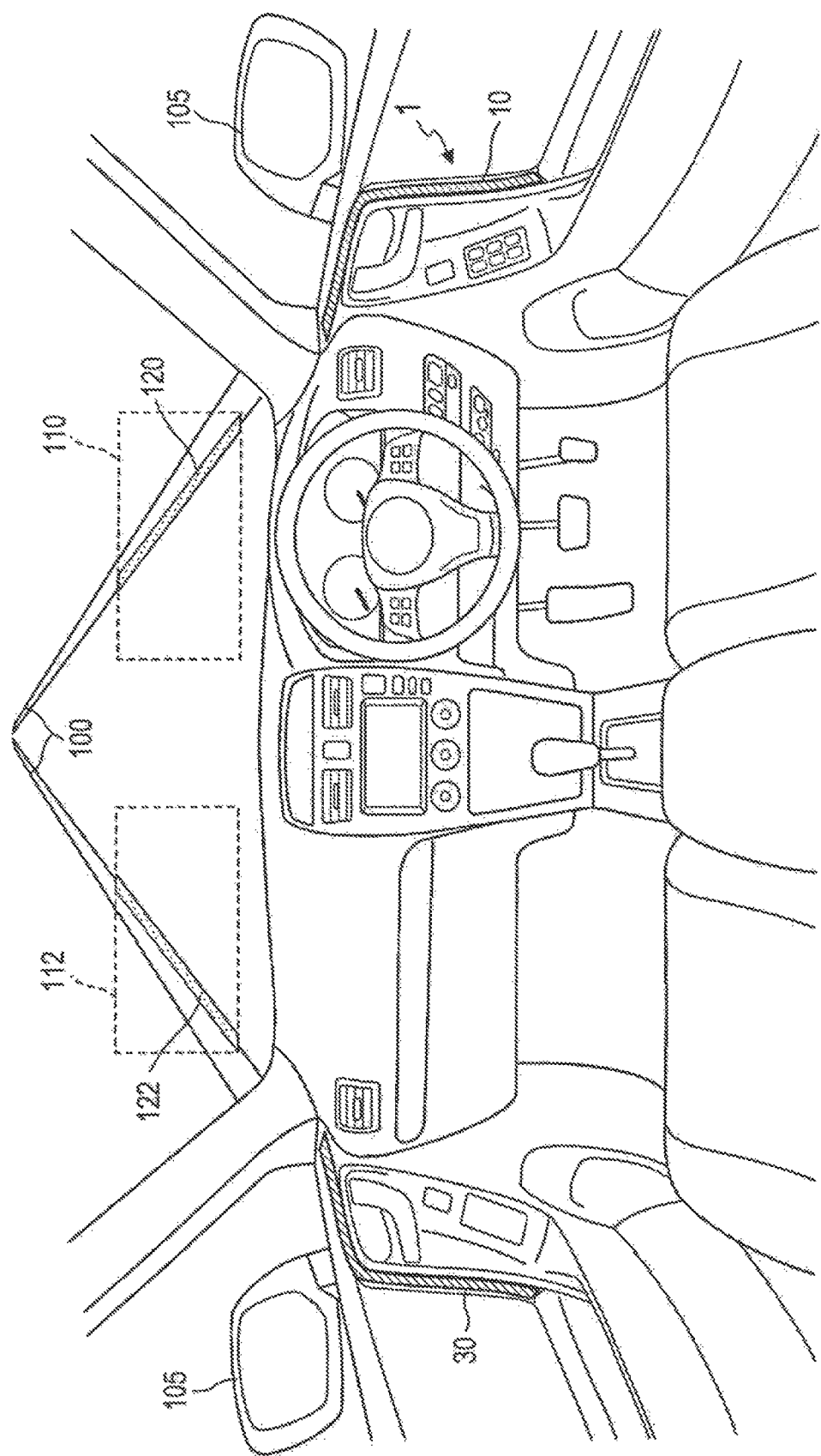
FIG. 14 is a diagram illustrating a modified example of the position of a projection target member.

In the foregoing embodiment, the projection target member 110 is a region of the windshield that is positioned forward of a driver seat. However, in the present disclosure, a region of the windshield that is positioned forward of the driver seat may be formed as the projection target member 110, and a region of the windshield that is positioned forward of a passenger seat may be formed as a projection target member 112, as in FIG. 14. In such an instance, the "line marking" 122 may be displayed on the projection target member 112.

The first and second light emission modes of the foregoing embodiment control not only the light emitters 10, 30 but also the display apparatus 72 of the head-up display 70. Alternatively, however, the first and second light emission modes may control the light emitters 10, 30 only and exclude the display apparatus 72 of the head-up display 70 from control.

The present disclosure may be implemented not only by the earlier-described information providing apparatus, but also by various other means including a program product stored on a non-transitory computer-readable medium and executed by a computer to provide information and a control method for controlling a light emitter and a display apparatus.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

What is claimed is:

1. An information providing apparatus that is mounted in a vehicle, the information providing apparatus coordinating with a first light emitter and a second light emitter different from the first light emitter, the first light emitter including a plurality of light-emitting elements that are arranged in a linear form including at least one line on a compartment side of a door of the vehicle, the second light emitter being included in a head-up display mounted in the vehicle, the second light emitter emitting light that is projected onto a projection target member that is a part of a windshield of the vehicle arranged in a forward visual field of a driver of the vehicle, the information providing apparatus comprising:

an information acquisition section that repeatedly acquires status information including a surroundings status indicating a status of surroundings of the vehicle; and a light emission control section that executes control to the first light emitter and the second light emitter based on the status information acquired by the information acquisition section, the control making the first light emitter and the second light emitter provide light emission in a light emission mode associated with an acquired surroundings status that is the surroundings status indicated by the status information acquired by the information acquisition section, wherein, when the acquired surroundings status meet a predefined condition, the light emission control section executes the control that makes the first light emitter and the second light emitter provide light emission in a transitional light emission mode, the transitional light emission mode changing a target from which light is emitted sequentially from the first light emitter on the compartment of the door of the vehicle to the second light emitter emitting light projected onto the projection target member of the part of the windshield of the vehicle.

2. The information providing apparatus according to claim 1, wherein:

the information acquisition section repeatedly acquires the status information including the surroundings status that is a specific object status including a presence or an absence of a specific object being an object present in surroundings of the vehicle; and when the specific object status indicates the presence of the specific object, the light emission control section concludes that the predefined condition is met by the acquired surroundings status, and executes the control making the first light emitter and the second light emitter provide light emission in the transitional light emission mode.

3. The information providing apparatus according to claim 2,
wherein:
the information acquisition section acquires, as one of the surroundings status, direction indication information indicating a course that the vehicle is scheduled to take; and
when the specific object status indicates the presence of the specific object and the direction indication information indicates that the course of the vehicle is directed toward the specific object, the light emission control section
concludes that the predefined condition is met by the acquired surroundings status, and
executes the control making the first light emitter and the second light emitter provide light emission in the transitional light emission mode.

4. The information providing apparatus according to claim 1,
wherein:
among the plurality of light-emitting elements that are included in the first light emitter and arranged in the linear form, a light-emitting element arranged at an end frontward of the vehicle is regarded as a front-end element and a light-emitting element arranged at an end rearward of the vehicle is regarded as a rear-end element; and
the light emission control section executes, as the transitional light emission mode, the control making the target, from which light is emitted, sequentially change over time
from the rear-end element to the front-end element in the first light emitter, and then,
from the front-end element in the first light emitter to a predefined light emission region in the second light emitter.

5. The information providing apparatus according to claim 4,
wherein the light emission control section executes, in the transitional light emission mode, the control making the predefined light emission region in the second light emitter provide light emission projecting onto a region of the projection target member,
the region of the projection target member forming a line serially following the line of light-emitting elements in the first light emitter.

6. The information providing apparatus according to claim 4,
wherein the light emission control section executes, in the transitional light emission mode, the control making the predefined light emission region in the second light emitter provide light emission projecting onto a periphery of the projection target member.

7. The information providing apparatus according to claim 4,
wherein the light emission control section executes, in the transitional light emission mode, the control making the predefined light emission region in the section light emitter provide light emission projection onto at least one edge portion of the projection target member.

8. The information providing apparatus according to claim 1,
wherein:
in the linear form in which the plurality of light-emitting elements included in the first light emitter are arranged, an end frontward of the vehicle is regarded as a front end; and the front end of the first light emitter is positioned higher, in a vehicle height direction, than a door handle of the vehicle.

9. The information providing apparatus according to claim 1,
wherein the light emission control section executes, in the transitional light emission mode, the control making the predefined light emission region in the second light emitter provide light emission projecting onto a region of the projection target member,
the region of the projection target member of the part of the windshield forming a line serially following the line of light-emitting elements in the first light emitter arranged in the linear form on the compartment of the door of the vehicle.

10. An information providing apparatus that is mounted in a vehicle, the information providing apparatus coordinating with a first light emitter and a second light emitter different from the first light emitter,
the first light emitter including a plurality of light-emitting elements that are arranged in a linear form including at least one line on a compartment side of a door of the vehicle,
the second light emitter being included in a head-up display mounted in the vehicle, the second light emitter emitting light that is projected onto a projection target member that is a part of a windshield of the vehicle arranged in a forward visual field of a driver of the vehicle,
the information providing apparatus comprising:
a control circuit configured to
acquire repeatedly status information including a surroundings status indicating a status of surroundings of the vehicle, and
execute control to the first light emitter and the second light emitter based on the acquired status information,
the control making the first light emitter and the second light emitter provide light emission in a light emission mode associated with an acquired surroundings status that is the surroundings status indicated by the acquired status information,
wherein, when the acquired surroundings status meet a predefined condition, the control circuit executes the control that makes the first light emitter and the second light emitter provide light emission in a transitional light emission mode,
the transitional light emission mode changing a target, from which light is emitted, sequentially from the first light emitter to the second light emitter,
wherein the control circuit executes, in the transitional light emission mode, the control making a predefined light emission region in the second light emitter provide light emission projecting onto a region of the projection target member,
the region of the projection target member of the part of the windshield forming a line serially following the line of light-emitting elements in the first light emitter arranged in the linear form on the compartment of the door of the vehicle.

11. The information providing apparatus according to claim 10,
wherein:
among the plurality of light-emitting elements that are included in the first light emitter and arranged in the linear form, a light-emitting element arranged at an end frontward of the vehicle is regarded as a front-end element and a light-emitting element arranged at an end rearward of the vehicle is regarded as a rear-end element; and the control circuit executes, as the transitional light emission mode, the control making the target, from which light is emitted, sequentially change over time from the rear-end element to the front-end element in the first light emitter, and then, from the front-end element in the first light emitter to the predefined light emission region in the second light emitter.

* * * * *